US006536793B2

(12) United States Patent
Sargent

(10) Patent No.: US 6,536,793 B2
(45) Date of Patent: *Mar. 25, 2003

(54) DOUBLE-ACTING TRAILER HITCH

(76) Inventor: Frank T. Sargent, 811 Bentley Dr., Naples, FL (US) 34110

(*) Notice: Subject to any disclaimer, the term of this patent is extended or adjusted under 35 U.S.C. 154(b) by 0 days.

This patent is subject to a terminal disclaimer.

(21) Appl. No.: 09/973,434

(22) Filed: Oct. 9, 2001

(65) Prior Publication Data

US 2002/0036390 A1 Mar. 28, 2002

Related U.S. Application Data

(63) Continuation of application No. 09/580,300, filed on Jun. 26, 2000, now Pat. No. 6,299,191.
(60) Provisional application No. 60/136,074, filed on May 26, 1999.

(51) Int. Cl.[7] .................................................. B60D 1/01
(52) U.S. Cl. ........................ 280/455.1; 280/405.1; 280/494
(58) Field of Search ............................. 280/455.1, 494, 280/405.1, 495, 511, 477

(56) References Cited

U.S. PATENT DOCUMENTS

| | | | | |
|---|---|---|---|---|
| 2,680,626 A | * | 6/1954 | Hedgpeth | 280/406.2 |
| 2,772,893 A | * | 12/1956 | Wettstein | 280/406.2 |
| 3,814,463 A | * | 6/1974 | Tunesi | 280/455.1 |
| 6,142,500 A | * | 11/2000 | Sargent | 280/455.1 |
| 6,286,851 B1 | * | 9/2001 | Sargent | 280/455.1 |
| 6,299,191 B1 | * | 10/2001 | Sargent | 280/405.1 |

* cited by examiner

Primary Examiner—Daniel G. DePumpo
(74) Attorney, Agent, or Firm—William E. Noonan

(57) ABSTRACT

A double-acting, weight distributing trailer hitch includes a drawbar assembly and a hitchhead assembly. The drawbar assembly is releasably connected to a tow vehicle and includes a first coupling component at its rearward end. The hitchhead assembly includes a second coupling component and a rearwardly extending drawbar extension, which are pivotably connected along substantially vertical axis by a yoke. The drawbar extension is pivotally connected to the yoke by a cam. The drawbar extension is also mounted pivotably to the hitch ball along a first horizontal axis that is transverse to the direction of travel. A rearward portion of the drawbar extension is pivotably interconnected to the trailer along a second horizontal axis, which is parallel to the first horizontal axis and located behind the hitch ball. This creates an overlap between the forward end of the trailer and the drawbar extension. A spring assembly dampens pivoting of the drawbar extension about the horizontal axes and thereby dampens hinging movement between the tow vehicle and trailer. The cam is operated to adjust the hitchhead so that a predetermined angle is imparted to the drawbar. The coupled tow vehicle and trailer operate essentially as a unified beam and resist relative hinging movement and resulting instability while driving along the highway. The spring also allows the tow vehicle and trailer to stably negotiate dips and bumps in the roadway at relatively low speeds.

5 Claims, 22 Drawing Sheets

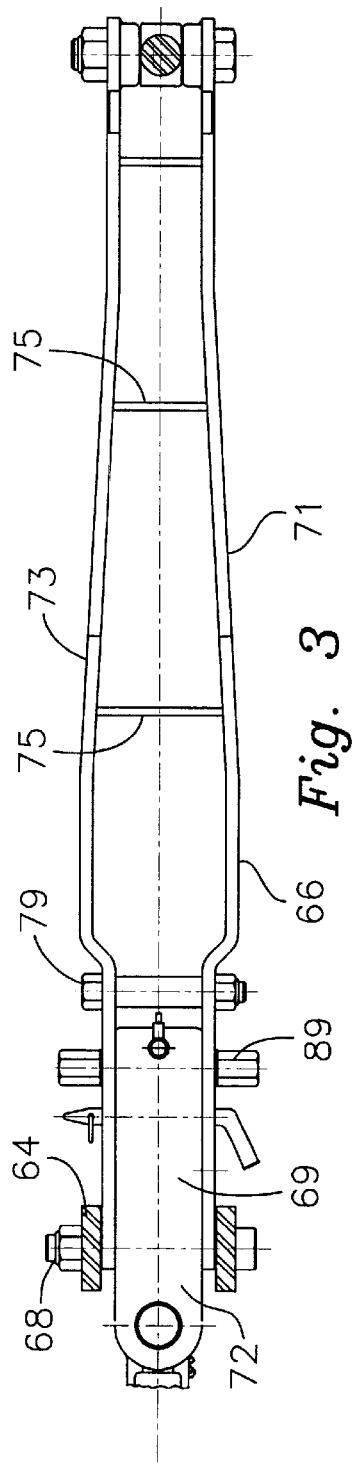
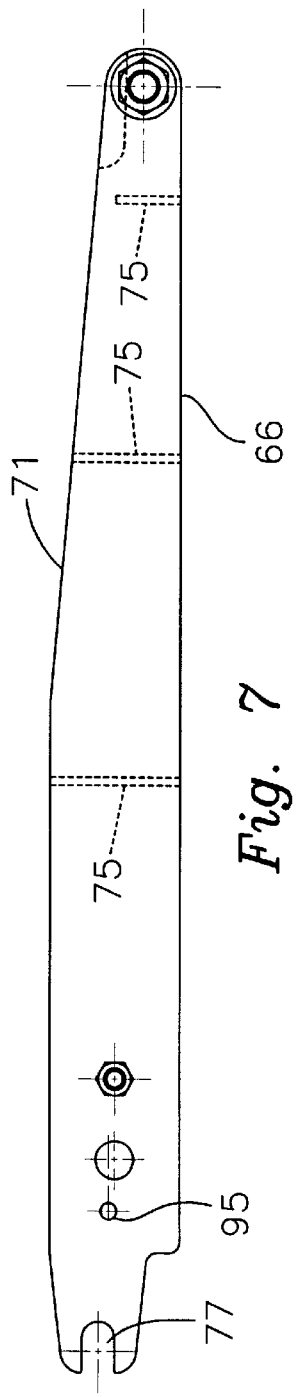
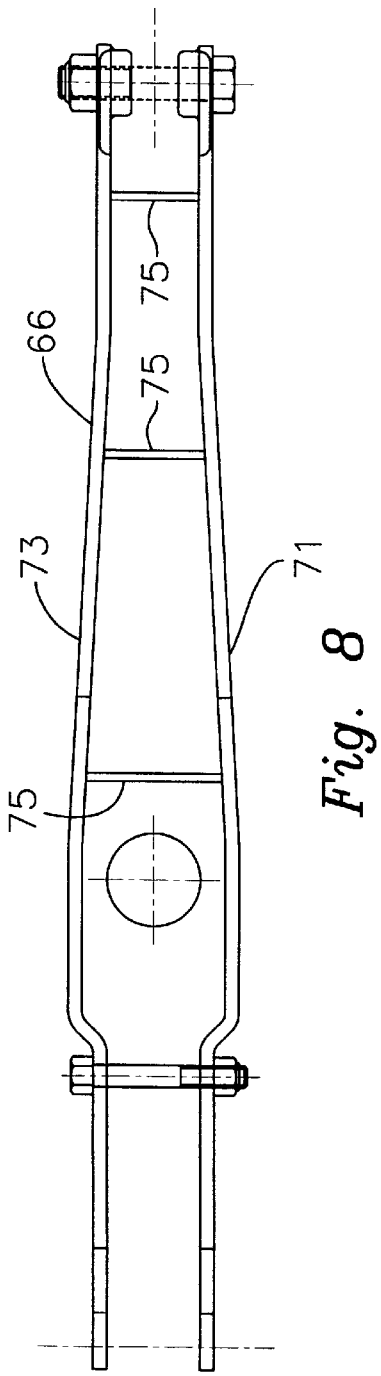

DOUBLE-ACTING TRAILER HITCH

RELATED APPLICATIONS

This application is a continuation of U.S. application Ser. No. 09/580,300 filed May 26, 2000, now U.S. Pat. No. 6,299,191 which application claims the benefit of Provisional Application No. 60/136,074 filed May 26,1999.

FIELD OF THE INVENTION

This invention relates to a double-acting trailer hitch that requires the use of significantly less tongue weight than is required in previously known trailer hitches and which may be used effectively with trailers having various tongue weights and with tow vehicles having various frame strengths.

BACKGROUND OF THE INVENTION

During the 1920s and 1930s, trailer hitches began incorporating a hitch ball attached to an extension of the tow vehicle and a ball coupler carried by the forward end of the trailer. The coupler was engaged with the ball so that the tow vehicle could pull the trailer along the highway.

A number of developments, including improved highways, more powerful automobiles and trucks, and the advent of electromagnetic trailer brakes allowed the vehicles and attached trailer to achieve greatly increased highway speeds. These developments also permitted much heavier trailers to be towed. The traditional ball hitch was soon found to be unacceptable for handling such increased speeds and trailer weights. In particular, the rig tended to be very unstable. The most significant source of instability was the upward hinging and toggling that occurred between the tow vehicle and the trailer at the point of the coupling ball. This was especially noticeable during braking. At such times, a portion of the linear momentum of the tow vehicle is converted to angular momentum. This causes the front of the tow vehicle to dip downwardly and the rear of the vehicle to pitch upwardly. In the case of the original ball hitch, the delay in activation of the trailer's electromagnetic brakes caused the significant weight of the trailer to push against the trailer ball. This tended to push the rear of the tow vehicle upwardly with even greater force. The height of the ball at the top of the hinge point effectively formed a toggle with front axle of the tow vehicle and the rear axle of the trailer. Accordingly, the linear momentum of the trailer was also converted into upward force on the ball. The toggle effect was exacerbated when the rig encountered bumps or dips on the highway. All of this made the traditional ball coupling highly unstable and contributed to serious highway accidents.

To counteract the instabilities of the original ball hitch, the weight-distributing hitch was introduced during the 1950s. Initially, the upward hinging exhibited between the tow vehicle and trailer was addressed by adding weight to the tongue of the trailer proximate the ball. It was determined that "a tongue weight" of approximately 10 to 15 percent of the gross trailer weight was generally adequate to prevent excessive upward hinging about the trailer ball. However, simply adding tongue weight was and still is, by itself, an inadequate remedy. This weight must be effectively distributed among the axles of the tow vehicle and the trailer so that the rear of the tow vehicle does not sag and a level, stable ride is maintained. Weight distributing trailer hitches that perform this function have been available for many years.

Notwithstanding their current widespread use, conventional weight distributing hitches still exhibit a number of disadvantages. The forces that these hitches generate to counteract the heavy tongue weight of the trailer tend to exert significant stress on the suspension of the tow vehicle. As a result, trucks, sport utility vehicles and full frame automobiles normally must be used as the tow vehicle. Smaller automobiles without a full frame are generally inadequate to support the force produced by the weight-distributing hitch. Such smaller vehicles normally cannot be used to pull a large trailer, which is equal to or heavier than the tow vehicle.

Moreover, the heavy tongue weights exhibited in present weight distributing hitches can create serious instabilities when the rig is driven at highway speeds. In particular, during a sudden lane change, which may result when the driver takes evasive action, the tongue weight carried by the overhang of the trailer behind the rear axle of the tow vehicle often creates a large X-axis moment transverse to the direction of travel. This moment can cause the tow vehicle and trailer to jackknife or flip. Serious accidents often result from such instability.

Trailer instabilities are inherent at all speeds of travel. At speeds below 40 mph they are usually not yet of such significance as to create unsafe travel. Instability increases as a function of speed of travel. At 50 mph some kind of control must be introduced or it is simply so unsafe that the speed cannot be maintained.

The upper threshold of safe travel of a tow vehicle towing a heavy trailer by means of a ball coupler alone is approximately 35 mph for the heavy trailers to approximately 45 mph for lighter trailers. These figures are approximate. The greater the trailer weight is in proportion to the tow vehicle's weight, the lower the speed at which the coupled vehicles can safely travel.

The free hinging movement at the trailer ball is also a factor in trailer instability. The height of the trailer ball is another factor, because the higher the ball above the axles of the vehicles, the greater is the upward thrust of the toggle at the ball.

Where the ball pitches upward during tow car braking (and before trailer braking is effective due to the magnet delay) the toggle is increased significantly. A heavy trailer thrusting forward on the rear arm of the toggle is pushing upwardly on the ball lifts the rear end of the tow vehicle which causes dangerous loss of traction on the road surface.

Conventional weight distributing trailer hitches also normally require that the trailer axles be positioned fairly close together and located a significant distance from the trailer tongue. This is needed in order to provide the trailer with the necessary tongue weight. If the trailer axles are positioned close together, optimal trailer stability may not be exhibited.

One known trailer hitch designed for use with relatively lightweight frameless automobiles employs a dolly that is mounted beneath the hitch. The dolly travels along the roadway with the rig and supports the tongue weight without distributing the weight to the tow vehicle. This apparatus is unduly complicated and introduces additional wheels that must engage the highway. A failure of the dolly wheels will render the entire rig inoperable.

In my co-pending patent application U.S. Ser. No. 60/109, 285, filed Nov. 20, 1998, I disclose a double-acting, reduced tongue weight trailer hitch that permits the trailer tongue weight to be significantly reduced so that less stress is placed on the springs and suspension of the tow vehicle. At the same time, hinging and toggle action between the tow vehicle frame and the trailer frame are significantly reduced and towing stability is improved. Although the hitch apparatus described in that application is quite effective, I have determined that it is desirable to provide a weight distributing hitch that is even more versatile and which may be used effectively with a wide variety of trailer tongue weights and a similar wide variety of tow vehicles frame strengths.

SUMMARY OF INVENTION

It is therefore an object of the present invention to provide a trailer hitch in which tongue weight is not a factor in towing stability, thus permitting the use of a significantly reduced tongue weight.

It is a further object of this invention to provide a trailer hitch, which joins the frame of the tow vehicle and the frame of the trailer such that they behave as a single piece along an axis extending in the direction of travel.

It is a further object of this invention to provide a trailer hitch that eliminates the upward hinging and toggle action between the tow vehicle frame and the trailer frame so that significantly improved and more stable towing is achieved.

It is a further object of this invention to provide a trailer hitch that permits the tongue weight to be greatly reduced so that less stress is placed on the springs and suspension of the tow vehicle.

It is a further object of this invention to provide a trailer hitch that reduces the dangerous instability and risk of jackknifing often accompanying evasive maneuvers and sudden lane changes.

It is a further object of this invention to provide a trailer hitch, which exhibits extremely stable operation, but without requiring the use of a heavy tongue weight.

It is a further object of this invention to provide a trailer hitch that minimizes the transverse moment at the trailer ball and resulting instability caused when a tow vehicle and trailer swerve on the highway.

It is a further object of this invention to provide a trailer hitch apparatus that reduces the tongue weight of the trailer so that additional accessories and/or equipment are not required to be mounted to the forward end of the trailer.

It is a further object of this invention to provide a weight distributing trailer hitch that may be used effectively for trailers having a wide range of tongue weights (e.g. less than 300 pounds to 1500 pounds, or even more).

It is a further object of this invention to provide a weight distributing trailer hitch that may be adjusted for stable and effective use in combination with light, medium and heavy tow vehicle frame constructions.

It is a further object of this invention to provide a weight distributing trailer hitch apparatus that employs an effective coil spring dampening system to control and reduce bounce and greatly improve ride stability.

It is a further object of this invention to provide a weight distributing trailer hitch employing an easy to operate cam that adjusts the hitchhead quickly and reliably so that the hitchhead and the drawbar can be coupled and the tongue weight is properly and evenly distributed to the tow vehicle.

It is a further object of this invention to provide a trailer hitch of both the weight distribution kind and the low weight kind which converts the toggling upward force at the trailer coupling (which force is generated by the trailer pushing against the coupling means such as during braking) into a downward force at the coupling and thus causing this force to become a force which increases stability, instead of being a force which increases instability as in previous practice.

It is a further object of this invention to provide control of the angular forces of momentum in the tow vehicle during the short period of early braking which occurs before the electric brakes of the trailer become effective.

It is a further object of this invention to provide a trailer hitch apparatus that improves tow vehicle and trailer stability by employing an X-axis coupling, which is located below the centerlines of the tow vehicle and trailer axles and which does not intersect the Z-axis coupling.

It is a further object of this invention to provide a hitch that significantly reduces the need for heavy tongue weights and redistributes those lesser weights to the axles of the tow vehicle and trailer so that a safer, more stable ride is achieved and less stress is placed on the tow vehicle.

This invention results from a realization that the normally high tongue weights used in weight-distributing trailer hitches may be significantly reduced by employing preloaded, double-acting spring means for dampening the relative movement between the tow vehicles and the trailer about a horizontal (X) axis transverse to the direction of travel. The number of springs may be selected to accommodate tongue weights of less than 300 pounds to 1,500 pounds or more. This invention results from the further realization that tongue weight may be reduced and stability improved by pivotably overlapping the forward end of the trailer and the X-axis coupling and joining the drawbar extension of the tow car hitch to the trailer at a point rearwardly of and below the hitch ball. This enables the tow vehicle and trailer to act essentially as a unified beam, which is controlled by a preloaded spring so that hinging and toggling are eliminated when the rig is driven at highway speeds. Conversely, hinging is allowed to occur between the tow vehicle and trailer when bumps and dips are encountered at low speeds. The overlapping of the drawbar extension and the trailer frame, as well as the use of a preloaded double-acting spring assembly also helps to safely control the force of angular momentum normally generated in the tow vehicle during braking. As used herein, "double-acting" means that the spring assembly controls both upward and downward motion of the tow vehicle and trailer at their point of interconnection, which is located proximate the rearward end of the drawbar extension significantly behind and below the hitch ball. Finally, this invention results from the realization that a cam mounted to the drawbar extension may be utilized to align the hitchhead and the drawbar for interconnection and to quickly, conveniently and effectively distribute a portion of the tongue weight to the frame and wheels of the tow vehicle.

This invention features a double-acting trailer hitch for interconnecting a trailer to a tow vehicle. The hitch includes a drawbar assembly that is selectively attached to the tow vehicle. A first coupling component is attached to a rearward end of the drawbar. A hitchhead assembly includes a ball element that carries a clevis and is suspended by a ball coupling supported by the trailer. The hitchhead also includes a yoke that is pivotally connected to the clevis by a horizontal pivot that is axially transverse to the direction of travel. A drawbar extension is interengaged with and extends generally rearwardly from the horizontal pivot. A second coupling component is pivotally connected to the yoke along a generally vertical axis. The second coupling component may include means for interengaging complementary means in the first coupling component such that the first and second coupling components are coupled and the drawbar is held at a predetermined axial angle relative to the ground. In particular, cam means interconnecting the drawbar extension and the yoke are adjusted to configure the first and second coupling components such that they may be coupled and to hold the drawbar at the predetermined axial angle. There are also means located rearwardly of the ball component for interconnecting a rearward portion of the drawbar extension to the trailer. Such means for interconnecting include a horizontal pivot that is substantially parallel to the horizontal axis and perpendicular to the direction of travel. The means for interconnecting also include preloaded spring means for dampening movement of the drawbar extension relative to the trailer. While the tow vehicle and trailer travel in a straight line on a relatively level highway, the preloaded spring means resist pivoting of the drawbar extension, and the tow vehicle and frame move forwardly as a single unified structure. When the tow vehicle engages bumps and dips in the roadway, the spring means permit the drawbar extension to temporarily pivot relative to the trailer, until the undulation is crossed. The preloaded spring means then return the drawbar extension to its original condition.

In a preferred embodiment, the first coupling component is fixedly interconnected to the drawbar. The first and second coupling components may include elements that prevent hinging or pivoting movement between the first and second coupling components. For example, the first coupling component may include an upper and a lower hitchpin hole. The second coupling component may include a horn featuring an upper slot or recess and a lower hitchpin hole. The horn may also include a ramp that is connected to the upper slot. The drawbar assembly may be directed against the horn such that the upper hitchpin rides up the horn and drops into the slot of the second coupling component. The lower hitchpin hole of the horn may be positioned at a selected vertical angle relative to the slot (e.g. 2°, 4°, 6°). This angle is chosen to impart a desired angle to the drawbar and thereby a corresponding torsion to the frame of the tow vehicle when coupling is completed. A horn having a desired angle may be installed, removed and replaced as required. After the upper hitchpin of the first coupling component is dropped into the slot, the lower hitchpin hole of the first coupling component is separated from the lower hitchpin hole of the second coupling component by the selected angle. The installer aligns these holes by operating the adjustment cam that interconnects the drawbar extension and the yoke of the hitchhead. By rotating the adjustment cam in a first direction, the lower hitchpin holes are aligned. A lower hitchpin is then inserted through the aligned holes to interconnect the first and second coupling components. The adjustment cam is then rotated in an opposite direction such that the hitchhead tilts forwardly and the selected angle is imparted to the drawbar. This transmits a corresponding torsion to the frame of the tow vehicle.

The second coupling component may include means for adjusting the height of the second coupling component. Such means may include a vertical channel element that is slidably interengaged with the horn. Means may be provided for interlocking the horn in the channel element at a selected height. The height adjustment allows the user to fine-tune the hitch to accommodate differing tow vehicle heights. Additionally, the drawbar assembly may be constructed so that the first coupling component is disposed at an angle to the drawbar. As a result, the drawbar assembly may be inverted to position the first coupling component at differing heights relative to the hitchhead assembly. The drawbar assembly is selectively inverted, depending upon the height of the tow vehicle, so that the first coupling component is held at a height that conveniently interengages the second coupling component carried by the hitchhead.

The spring means preferably include at least one generally helical coil or compression spring and linkage that are interconnected between the rearward end of the drawbar extension and the trailer. Each spring may be disposed in a housing that is mounted in the trailer frame. A single spring may be utilized for relatively low tongue weights; a pair of springs may be employed for medium tongue weights; and three springs may be used for heavy tongue weights. The spring assemblies may be adjustably preloaded to dampen pivoting of the drawbar extension about the horizontal axis by a selected or predetermined amount. The spring assembly may include a connector link that is slidably mounted within the housing and resiliently engaged in each spring. The depending connector link may be pivotably interconnected to a distal portion of the drawbar extension. The spring means minimize the hinging motion or toggle effect normally exhibited between the trailer and the town vehicle and thereby reduce the need for using heavy tongue weights to counteract this effect.

This invention also relates to an improvement in a trailer hitch apparatus that releasably connects the trailer to a tow vehicle, wherein at least the tow vehicle has forward and rearward wheels and wherein the trailer and tow vehicle further include a longitudinal axis that extends generally between the center lines of the forwardmost tow vehicle axle and the rearwardmost trailer axle. The improvement includes a forward hitch portion that is releasably attachable to the tow vehicle. There is a rearward hitch portion that carries an X-axis coupling, which X-axis coupling is attachable to the trailer and disposable below the longitudinal axis, whereby a downward toggle is exerted on the X-axis coupling and, upon braking, the hitch apparatus applies a downward force to the rearwardmost axle of the tow vehicle.

The X-axis coupling may include a coupling pin that is releasably engaged with the hitch apparatus. A dual acting spring assembly may interconnect the X-axis coupling and the trailer. The rearward hitch portion may include a Z-axis coupling that is spaced apart and distinct from the X-axis coupling.

BRIEF DESCRIPTION OF THE DRAWINGS

Other objects, features and advantages will occur from the following description of preferred embodiments and the accompanying drawings, in which:

FIG. 3 is a top plan view of the drawbar extension and the yoke of the hitchhead;

FIG. 7 is a side elevational view of the drawbar extension;

FIG. 8 is a top plan view of the drawbar extension alone;

DETAILED DESCRIPTION OF PREFERRED EMBODIMENTS

Figure 1:
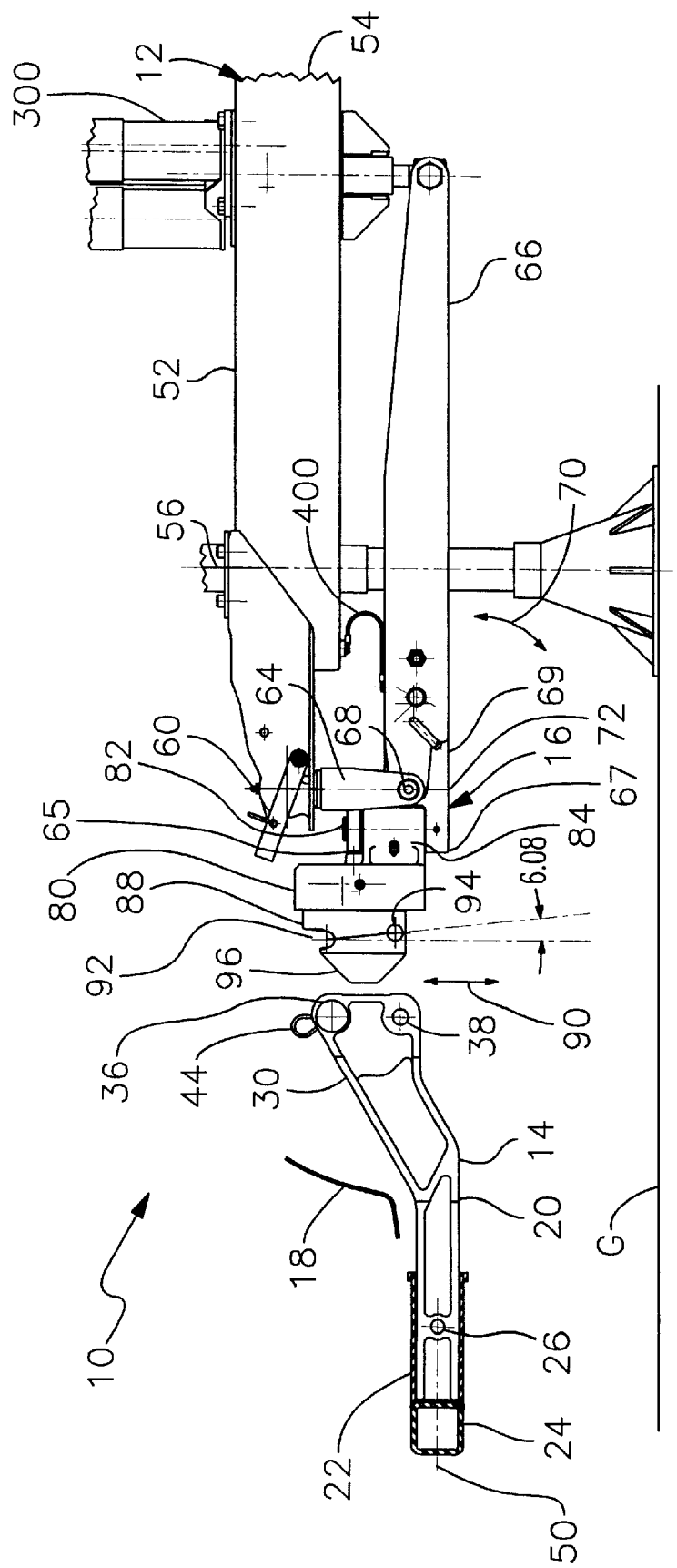
FIG. 1 is an elevational side view of a preferred trailer hitch according to this invention with the hitchhead assembly suspended from the front end of a trailer and the drawbar assembly interconnected to a tow vehicle; the hitchhead assembly and the drawbar assembly are depicted prior to coupling in accordance with this invention.
Figure 2:
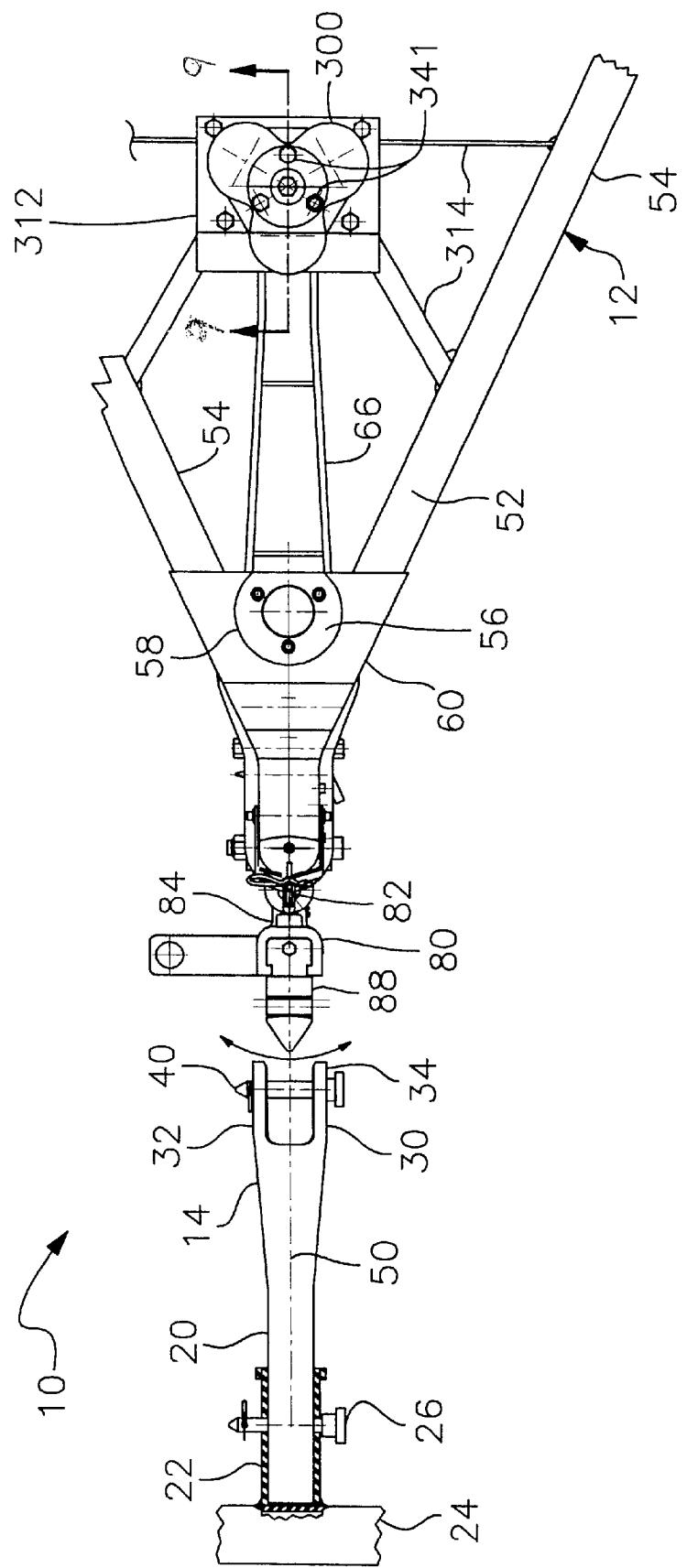
FIG. 2 is a top plan view of the trailer hitch.

There is shown in FIGS. 1 and 2 a preferred double-acting, reduced tongue weight hitch apparatus 10. It should be understood that a number of the components featured in the hitch of this invention are analogous and constructed similarly to corresponding features disclosed in my U.S. Pat. Nos. 5,951,036, 6,142,500 and 6,286,851. The descriptions contained in those patents are incorporated herein by reference.

In particular, hitch 10 is designed for attaching an A-frame trailer 12 to a tow vehicle, not specifically shown. Hitch 10 is suited for use in connection with various types of trailers, as well as all types and sizes of tow vehicles. Neither the type of tow vehicle nor the type of trailer should be construed as a limitation of this invention. It should also be understood that the axles and wheels of both the trailer and the tow vehicle are not depicted. These are standard components that do not comprise a part of the invention. Their relative positioning and operation should be understood to those skilled in the art. Nonetheless, through the use of the invention disclosed herein, the axles of the trailer may be spaced further apart than in conventional trailers. This is possible because of the significantly reduced tongue weight required by this trailer hitch. Repositioning the forward trailer axle closer to the tongue reduces the leverage of the tongue and thereby the tongue weight. This shall become more evident from the following description.

Hitch apparatus 10 includes a forward drawbar assembly 14 and a rearward hitchhead assembly 16. The hitchhead assembly is attached to and suspended from trailer 12 in a manner described in the above-referenced applications and further described below. The drawbar assembly is disposed beneath vehicle bumper 18 and includes an elongate drawbar, 20 which preferably has a square cross sectional shape. Bar 20 is selectively inserted in a complementary shaped receiver tube 22. The receiver tube is secured to and extends from a transverse mounting bar 24. This bar extends between and is attached to the longitudinal frame components of the tow vehicle. In tow vehicles not employing a frame, the transverse bar can be attached to various other structural components of the tow vehicle. Bar 20 is secured to tube 22 by a transverse pin 26. A first coupling component 30 is permanently and preferably unitarily fixed to drawbar 20. Component 30 comprises a shank that extends angularly from drawbar 20 and has a pair of spaced apart flanges 32 and 34, best shown in FIG. 2. These flanges include a pair of aligned upper holes 36 (FIG. 1) and a pair of aligned lower holes 38. Each pair of aligned holes receives a respective hitchpin. The upper hitchpin 40 that is attached permanently through holes 36 is shown in FIG. 2. The lower removable hitchpin is described more fully below. Likewise, the operation of the coupling component 30 and the hitchpins is described more fully below. Each pin is secured in its respective hole by a spring clip 44. The axis 50 of drawbar 20 is perpendicular to the line 52 interconnecting the centers of holes 36 and 38.

As shown in FIGS. 1 and 2, the front end of trailer 12 has a generally A-shaped frame 52 comprising an elongate pair of frame elements 54 that converge at the forward end of the trailer. A standard trailer jack 56 extends upwardly from ground G through a coupling plate 58 carried by the ball coupler 60 at the forward end of frame 52.

Hitchhead assembly 16 (also shown in larger scale in FIGS. 4 through 6) includes a standard ball element (hidden from view) that is threadably attached to a clevis 64. Alternatively, the ball may be welded or otherwise secured to the clevis. The ball element comprises the Y-axis coupling about which the rig rotates when one of the wheels strike a curb, for example. The ball is mounted in and suspended from ball coupler 60 in a conventional swiveling manner and, more particularly, in the manner shown and described in the above-referenced applications. The Y-axis is in the line of travel. The hitchhead further includes a yoke device 72 that is pivotally connected to the lower end of clevis 64 by a horizontal pivot or bolt 68. Yoke 72 includes a pair of upper and lower ears 65 and 67 respectively and a generally rearwardly extending shank 69.

Figure 8A:
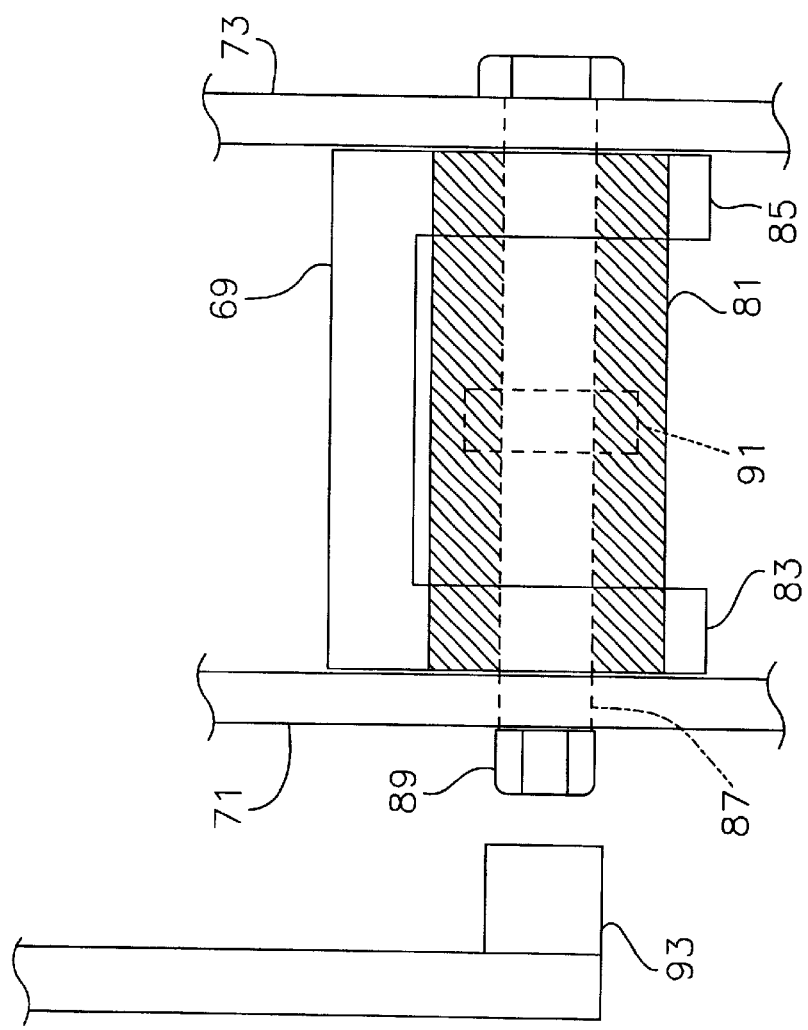
FIG. 8A is a cross sectional view of the drawbar extension and yoke with the cam and camshaft mounted therethrough.

As shown in FIGS. 1–3, a drawbar extension 66 (shown alone in FIGS. 7 and 8) is pivotally interconnected to pivot 68 at the lower end of clevis 64. More particularly, drawbar extension 66 includes a pair of elongate spaced apart elements 71 and 73 interconnected by struts 75. A recess 77 is formed at the forward end of each elongate element 71, 73. Each recess interengages clevis pivot 68 on respective sides of the clevis. As best shown in FIG. 3, elements 71 and 73 are sandwiched about shank 69 of yoke 72. A connector element 79 extends between elements 71 and 73 rearwardly of yoke shank 69. By tightening component 79 elements 71 and 73 of drawbar extension 66 are tightened against the yoke. Horizontal pivot 68 permits the drawbar extension and the yoke to pivot or rotate about a horizontal axis that is generally transverse to the direction of travel. As a result, the drawbar extension is permitted to pivot relative to the hitchball in the manner indicated by doubleheaded arrow 70 in FIG. 1.

As best shown in FIGS. 4 through 6 and 8A, shank 69 has a generally inverted U-shaped configuration. A generally cylindrical cam 81 is rotatably mounted within a pair of aligned depending openings in respective depending portions 83 and 85 of the shank. Cam 81 is rotated in these openings by a camshaft 87, which is mounted eccentrically through the cam. The respective ends of shaft 87 extend through components 71 and 73 of drawbar extension 66. A hex nut 89 is mounted to one end of shaft 87 outside of component 71. The camshaft and the cam are locked together by a pin 91 such that they rotate in unison relative to shank 69. Such rotation is accomplished by engaging lug wrench 93 with hex nut 89 and turning the lug wrench in a manner described more fully below.

As further shown in FIGS. 1 through 6, a pair of cam locking pin openings 95 (specifically FIG. 5) are formed in components 71 and 73 of the drawbar extension 66. These openings receive a cam locking pin 97 when the cam is rotated into a position such that a circumferential recess 99 in the cam is aligned with openings 95. When the aligned openings and recess receive the cam locking pin 97, the cam is prevented from rotating within the shank 69. With the cam locking pin removed, the cam is rotated to adjust the hitchpin and the drawbar extension so that the desired axial angle is imparted to the drawbar. This operation is described below.

A channel member 80, FIGS. 1, 2 and 4 through 6, is pivotally connected to hitchhead 16 by a generally vertical pin or shaft 82. More particularly, channel 80 is attached to an integral mounting segment 84 that is received between the upper and lower ears 65 and 67 of yoke 72. See the analogous construction disclosed in U.S. application Ser. Nos. 09/109,740 and 60/109,285. As a result, channel member 80 is pivotal about a Z-axis relative to hitchhead 16 and drawbar extension 66 in the manner indicated by the doubleheaded arrow in FIG. 2. The pin 82 effectively forms a Z-axis coupling.

A horn 88, best shown in FIGS. 1 and 2, is slidably mounted in channel 80 in the manner describer in the previously referenced applications. As a result, horn 88 may be adjusted vertically within channel 80 as indicated by doubleheaded arrow 90 in FIG. 1. Horn 80 includes an upper recess or slot 92 and a lower hitchpin hole 94. An incline or ramp 96 extends from the forward end of the horn to a point adjacent recess 92. The channel member and its djustable attached horn comprise a second coupling component that is interengaged with the first coupling component in a manner more fully described below.

In the versions shown in FIGS. 1 through 13, there is a 6° angle between the vertical axis extending through recess 92 and a line interconnecting the centers of that slot and lower hitchpin hole 94. This represents the angle which drawbar 20 is axially tilted after the adjustments below are made. This angle is selected so that proper weight distribution is made for the particular tow vehicle being used. A light tow vehicle frame will typically require a large angle, whereas a heavier tow vehicle frame will require a smaller angle. The following chart represents preferred horn angles.

| HORN ANGLE | TOW VEHICLE FRAME |
|---|---|
| 2° | Heavy Frame (e.g. ¾ ton suburban type) |
| 4° | Medium Frame (e.g. ½ ton suburban type) |
| 6° | Light Frame (e.g. passenger car type) |

It should be noted that these angles are not limitations of this invention. For trailers with heavier tongue weights a particular class of vehicle may employ a greater angle.

Figure 9:
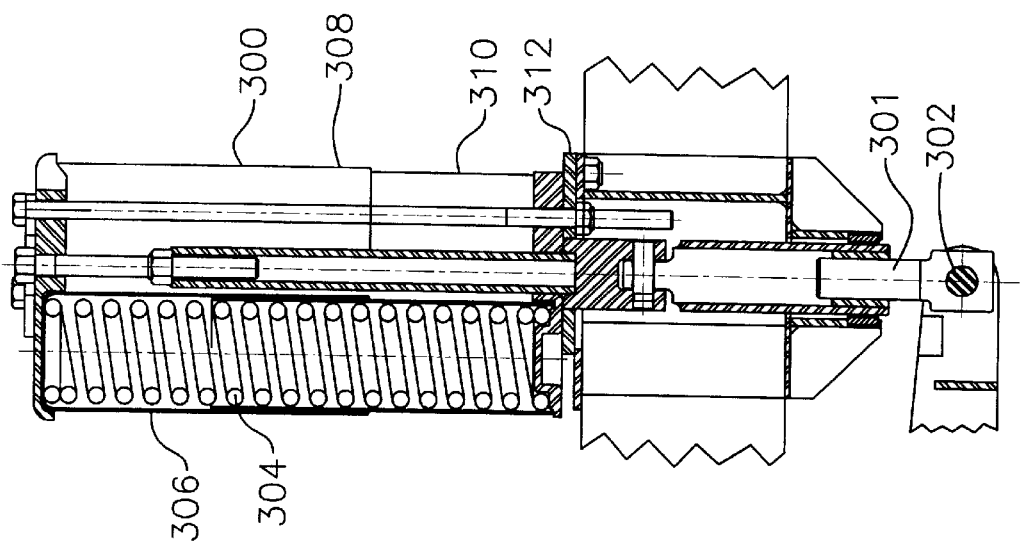
FIG. 9 is a cross sectional view taken along line 9—9 of FIG. 2.
Figure 9A:
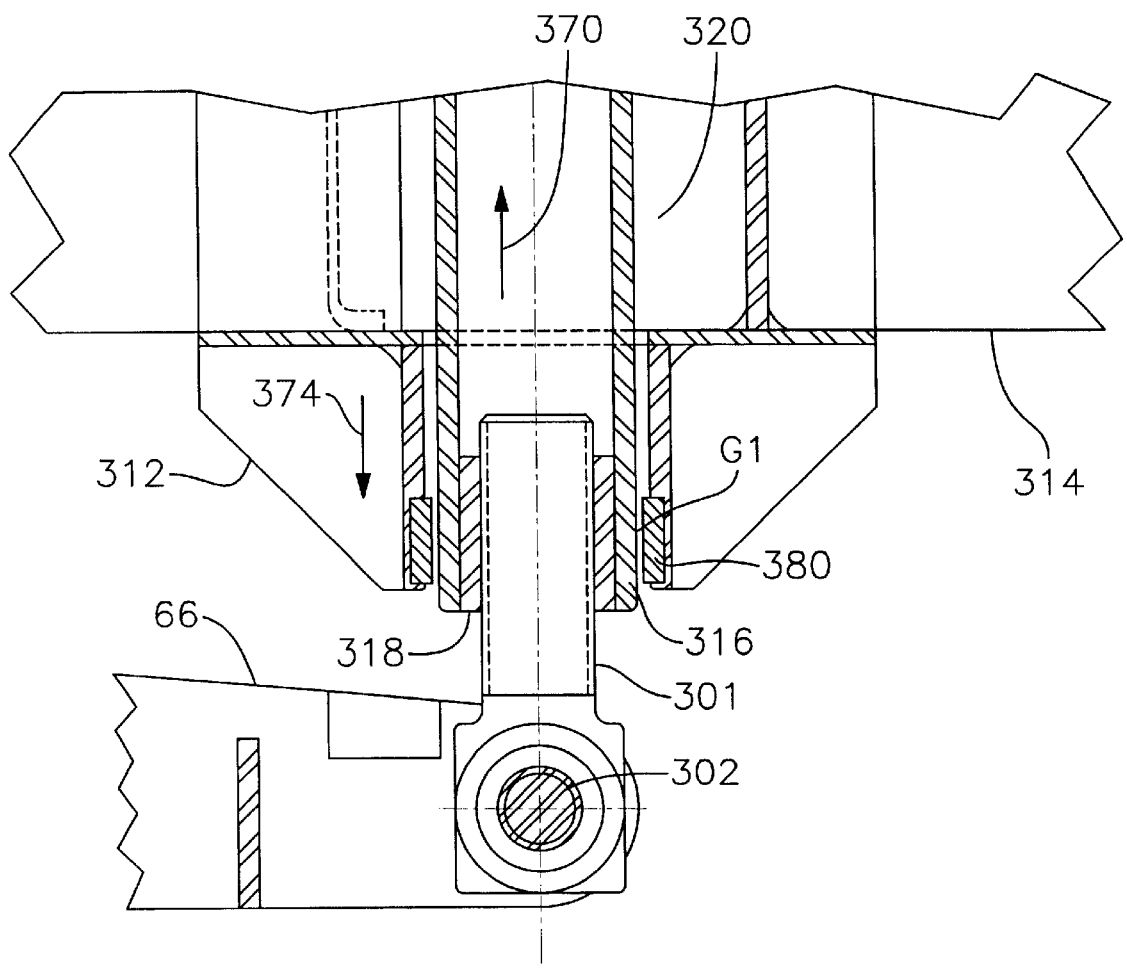
FIG. 9A is an elevational side, cross sectional view of the lower end of the spring dampening assembly of FIG. 9.

Drawbar extension 66 is interconnected to trailer frame 52 proximate the rearward distal end of the drawbar extension. More particularly, drawbar extension 66 is interconnected to the trailer frame by a vertically disposed dampening spring assembly 300, FIGS. 1 and 2. As also shown in FIGS. 9 and 9A, the distal end of the drawbar extension is pivotally connected to a connecting link 301 of spring assembly 300 at X-axis pivot 302. In the version shown in FIGS. 1 through 13, the spring assembly employs three axially vertically arranged compression springs 304 of the type shown in FIGS. 9–9C. Each spring 304 is disposed within a corresponding tubular housing 306. The housing has upper and lower cylindrical components 308 and 310 that are telescopically interengaged. Components 308 and 310 may be contracted longitudinally relative to one another to compress spring 304 and are expanded longitudinally relative to one another by the normal spring bias. The tubular spring housings are mounted to the trailer frame by a bracket 312, which is mounted to a spring unit support frame assembly 314.

Figure 9B:
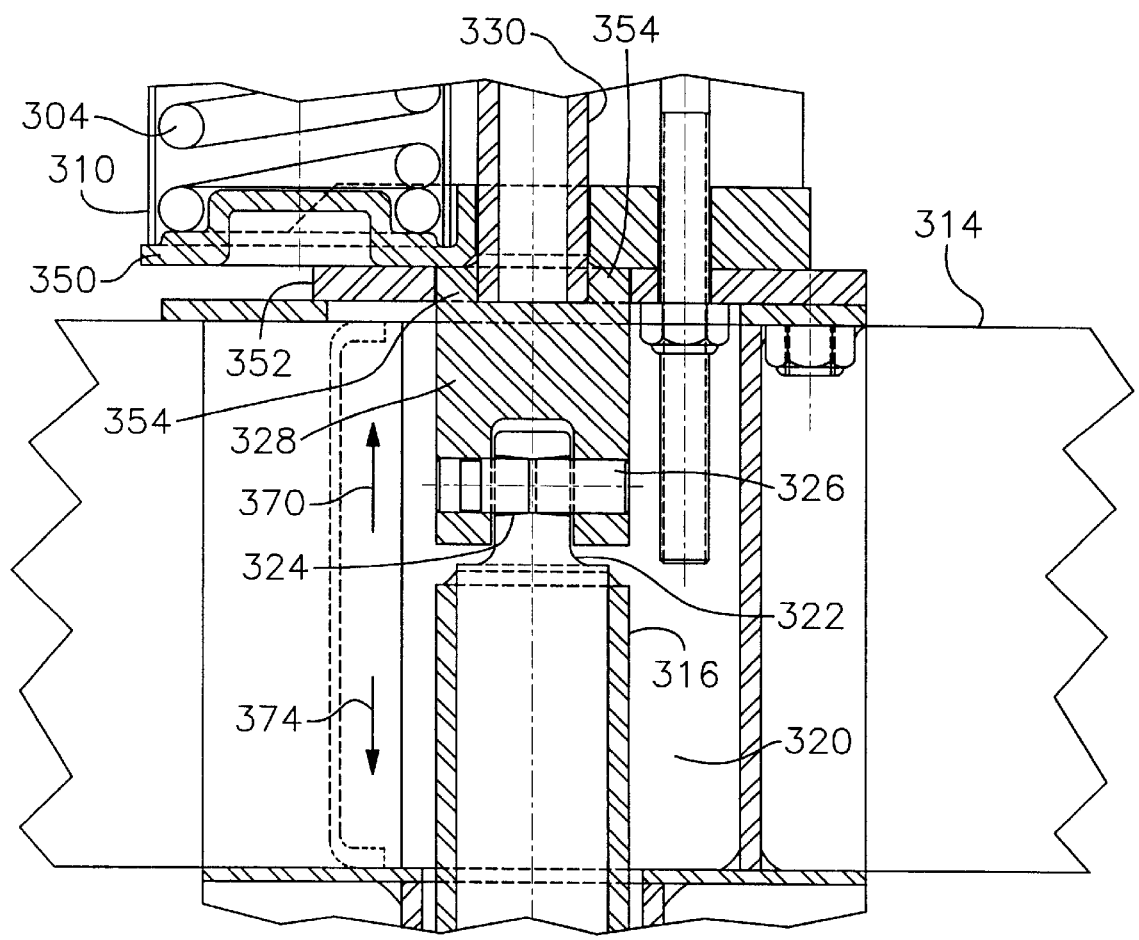
FIG. 9B is an elevational side, cross sectional view of an intermediate portion of the spring dampening assembly.
Figure 9C:
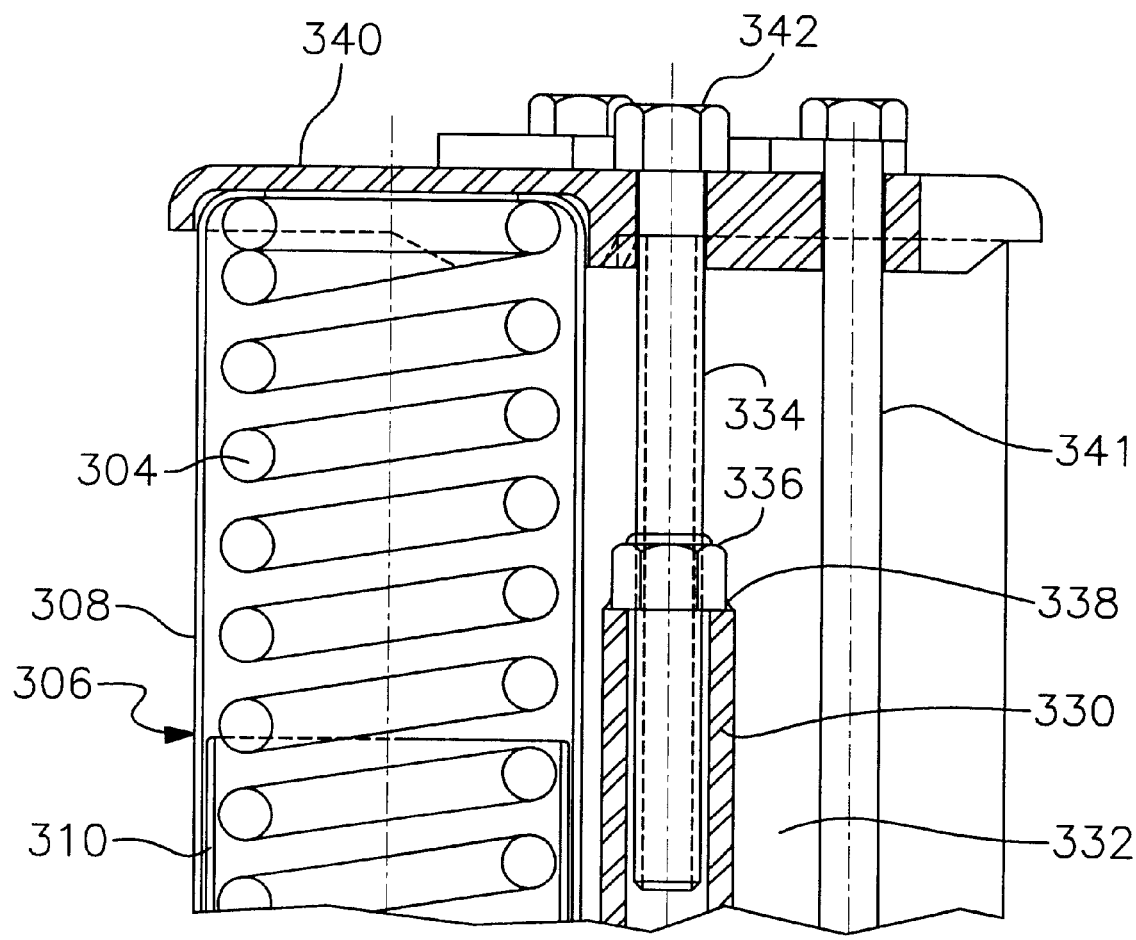
FIG. 9C is an elevational side, cross sectional view of the upper end of the spring dampening assembly.

Spring assembly 300 is shown in greater detail in FIGS. 9A through 9C. Connector link 301 is received in the lower end of a generally cylindrical link assembly 316 and secured therein by appropriate means. In the version shown, a threaded sleeve or bushing 318 is fastened to link connector 301 and threadably interengaged with interior threads of link assembly 316. Link assembly 316 extends upwardly through bracket 312, as best shown in FIG. 9B. The link assembly carries a projection 322 at its upper end. A tapered channel 324 is formed through projection 322. A pin 326 is received through tapered channel 324 and a corresponding hole formed through a depending connector block 328. A drive tube 330 is welded, threaded or otherwise permanently secured to and extends upwardly from the upper end of block 328. Tube 330 extends, as shown in FIGS. 9B and 9C, through an interior space 332 formed between the spring cylinders 306. The upper end of tube 330 receives a threaded shaft 334 that carries a nut 336. Tube 330 is welded to nut 336 as shown at 338, FIG. 9C. The upper end of shaft 334 extends slidably through an upper cap 340 and carries a head 342. Cap 340 interengages each of the three spring cylinders 306 at the upper end of respective cylindrical component 308. The cap is slidably engaged with three posts 341, FIG. 2, one of which is shown in FIG. 9C. The lower end of each post is secured to a plate 343, FIG. 9B.

As best shown in FIG. 9B, the lower end of each spring 304 sits on a movable base portion 350 and an inner surface of movable base portion 350 sits on a fixed base portion 352. Fixed base portion 352 is a generally annular element having a central opening that slidably receives an upwardly projecting lip 354 of block 328. Lip 354 interengages an interior portion of movable base 350 proximate tube 330.

Spring assembly 300 dampens relative movement between the trailer and the rearward end of drawbar extension 66, located at the X-axis couple or pivot 302. When the rig engages a bump in the road, connector link 301 urges link assembly 316 upwardly as indicated by doubleheaded arrow 370, FIG. 9A. As shown in FIG. 9B, this urges block 328 upwardly in the direction of arrow 370. Tube 330 drives shaft 334 upwardly through cap 340. Lip 354 likewise urges movable base 350 upwardly to resiliently compress lower cylindrical components 310 and respective coil springs 304. The three coil springs dampen the upper movement.

Conversely, when the rig engages a dip in the road, the connector link and attached link assembly are pulled downwardly in the direction of arrow 374. This pulls tube 330 downwardly, FIGS. 9B and 9C. As a result, upper cap 340 is pulled downwardly by shaft 334 and slides along posts 341. The upper cap pushes upward cylindrical components 308 resiliently downwardly against their respective coil springs 304. Downward movement of the trailer is therefore also dampened.

It should be noted that the springs may be selected and preloaded to accomplish desired dampening. The preloaded compression springs largely replace the pressure required by conventional heavy tongue weights and serve to significantly reduce hinging and toggling effects. The trailer and tow vehicle act as a unified beam and improved stability is achieved. Preloading the coil springs eliminates the tedious and often difficult task of preloading conventional trailer hitch spring bars.

It should be noted that the spring assembly is constructed to permit some degree of play as the trailer is pulled. In particular, as shown by FIG. 9A a gap G1 is formed between link assembly 316 and a bearing 380 carried by bracket 312. Similarly, pin 326, FIG. 9B, is received through tapered opening 324 and projection 322. During operation, link assembly 316 pivots axially about pin 326 and likewise pivots about the fulcrum of its tapered surface 324. Gap G1 provides the lower end of the link assembly with some degree of movement or play. This facilitates turning of the tow vehicle and trailer and allows the rig to negotiate at least moderate curbs and similar obstructions. The tow vehicle and the trailer do not have to be perfectly axially aligned but rather can be slightly angled relative to one another about the Y-axis of travel. Gap G1 and tapered surface 324 provide the needed play so that the drawbar extension can twist slightly relative to the trailer.

It has been determined that trailers having a tongue weight of approximately 1,000 to 1,500 pounds operate particularly well using the three spring dampening assembly shown in FIG. 9. In alternative embodiments, wherein lesser tongue weights are utilized, a spring assembly having two or even one dampening spring may be employed. Such springs are shown more fully below.

The spring assembly serves to dampen rotation of drawbar extension 66 about both pivot 66 and rearward pivot 302. The spring is preloaded to resist virtually any hinging between the tow vehicle and the trailer during braking, slowing or normal driving.

As previously described, the version shown in FIGS. 1 through 13 employs a 6° horn angle. In this case the horn has been selected to distribute the weight of the trailer to a passenger car or other tow vehicle having a relatively light frame. Hitch apparatus 10 is installed in the following manner. Initially, drawbar 20 is inserted into receiver tube 22. The trailer is then leveled with respect to the ground using conventional leveling means. Next, the installer selects the orientation of the drawbar. This will depend upon the height of the tow vehicle. Normally, the receiver tube is mounted to the tow vehicle such that its axis is positioned anywhere from 10" to 17" above the ground. For low heights (e.g. 10" to 13.5") the drawbar assembly is orientated in the manner shown in FIG. 1. Coupling component 30 is angled upwardly and positioned proximate hitchhead assembly 16. Alternatively, in cases where a larger tow vehicle and a higher positioned receiver tube are used, the drawbar assembly may be inverted so that the coupling component is angled downwardly to meet the hitchhead assembly 16. It should be noted that in most cases the hitchhead assembly is positioned such that there is a distance of approximately 17" to 19" from the ground to the center of the ball. After the drawbar assembly is oriented properly, the bar 20 is inserted into receiver tube 22 and the pin 26 is connected to secure the drawbar assembly to the tow vehicle. The user then installs an upper hitchpin 40 through the aligned holes 36 and secures that hitchpin in place with an appropriate hitchpin clip 44.

The ball coupler and hitchhead assembly are installed in a manner analogous to that described in the referenced applications. In this particular hitch, horn 88 is selected to include the desired 6° horn angle. The horn is vertically adjusted within channel 80 so that the center of recess 92 is approximately equal to the height of the center of upper holes 36 and coupling component 30. The horn is then locked in place in the manner described in the referenced applications. In some cases the horn may be tack welded so that it is permanently fixed in the channel. At this point, the hitch installer's task is normally completed. In some cases, skilled laymen or homeowner may be able to undertake the above referenced installation procedures.

Figure 10:
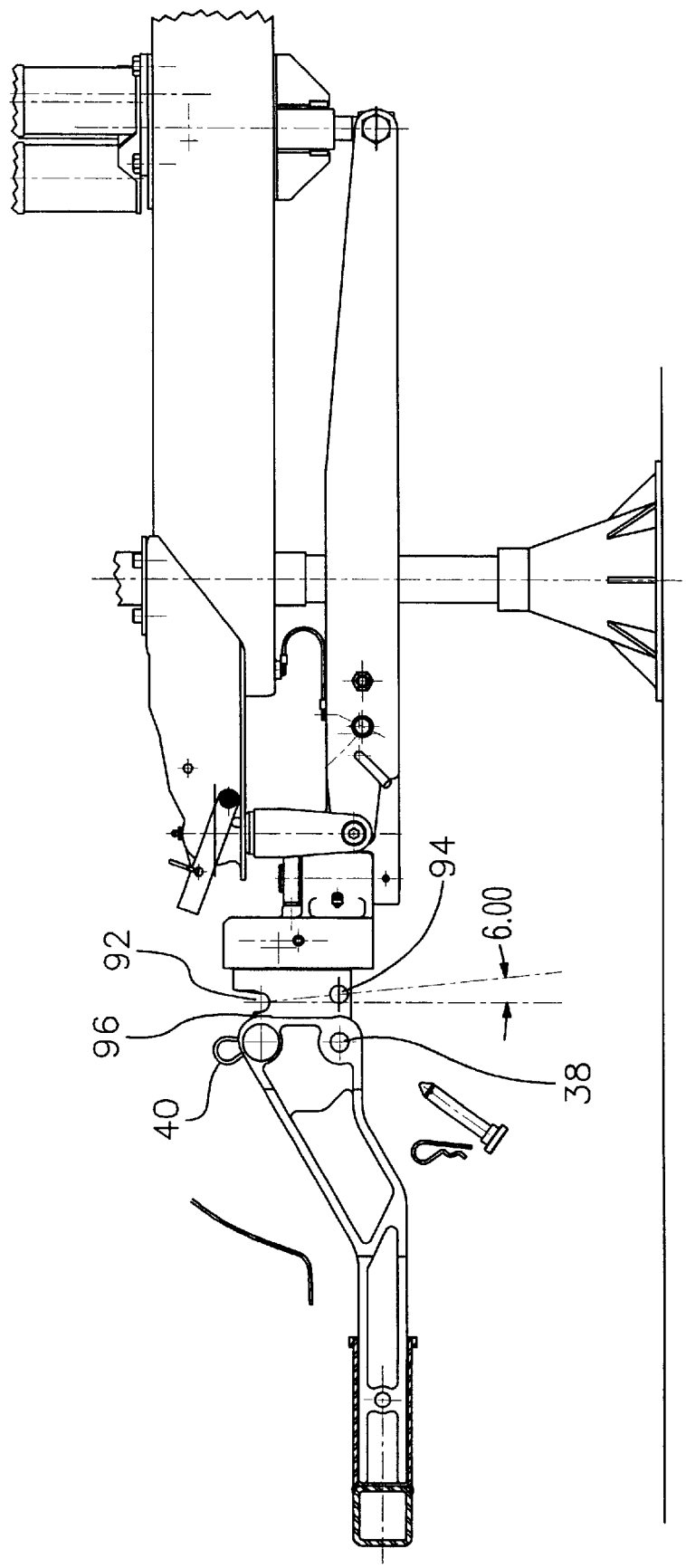
FIG. 10 is an elevational side view of the hitch as the drawbar and first coupling component are interengaging the horn of the second coupling component and the upper hitchpin is riding up the horn ramp.
Figure 11:
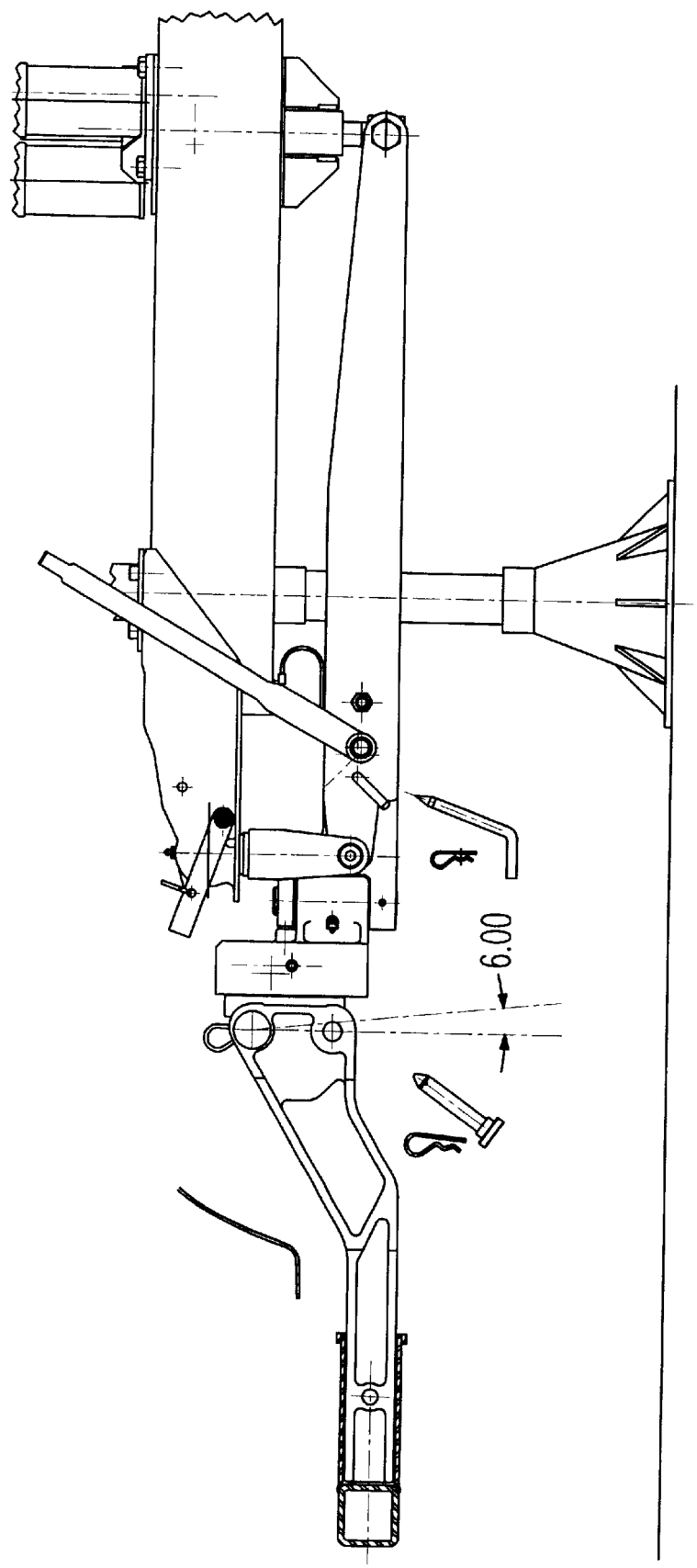
FIG. 11 is an elevational side view of the apparatus of FIG. 10 after the upper hitchpin has dropped into the slot of the second coupling component and before the lower hitchpin holes are aligned.
Figure 12:
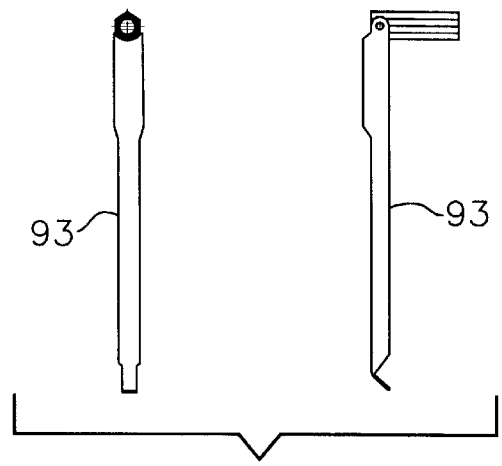
FIG. 12 is an elevational side and end views of the lug wrench for operating the adjuster cam on the drawbar extension.
Figure 13:
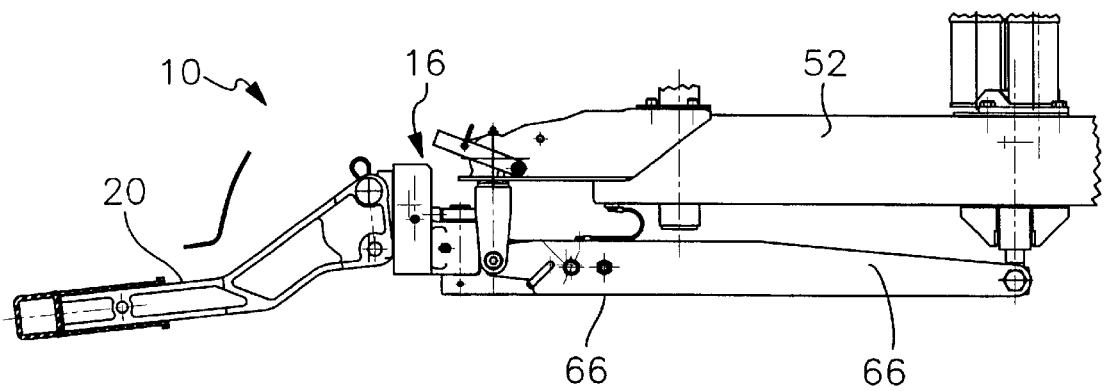
FIG. 13 is an elevational side view of the hitch in its fully interconnected and loaded condition with a 6° horn angle transferred to the torsion bar on the receiver of the tow vehicle.

To complete installation and coupling, the user operates jack 56 in a conventional manner so that the center of recess 92 is positioned approximately 0.75" above the center of holes 36. The apparatus is then coupled by simply driving the tow vehicle rearwardly toward the trailer. The upper hitchpin 40 interengages ramp 96 as shown in FIG. 10 and rides up the ramp until it drops horn recess 92. At this point, shown in FIG. 11, lower holes 38 of component 30 and the lower hole 94 of horn 88 are separated by an angle of approximately 6°. This amount is determined because the center of the lower horn hole is disposed approximately 6° rearwardly (i.e. toward the trailer) of the center of recess 92.

Figure 4:
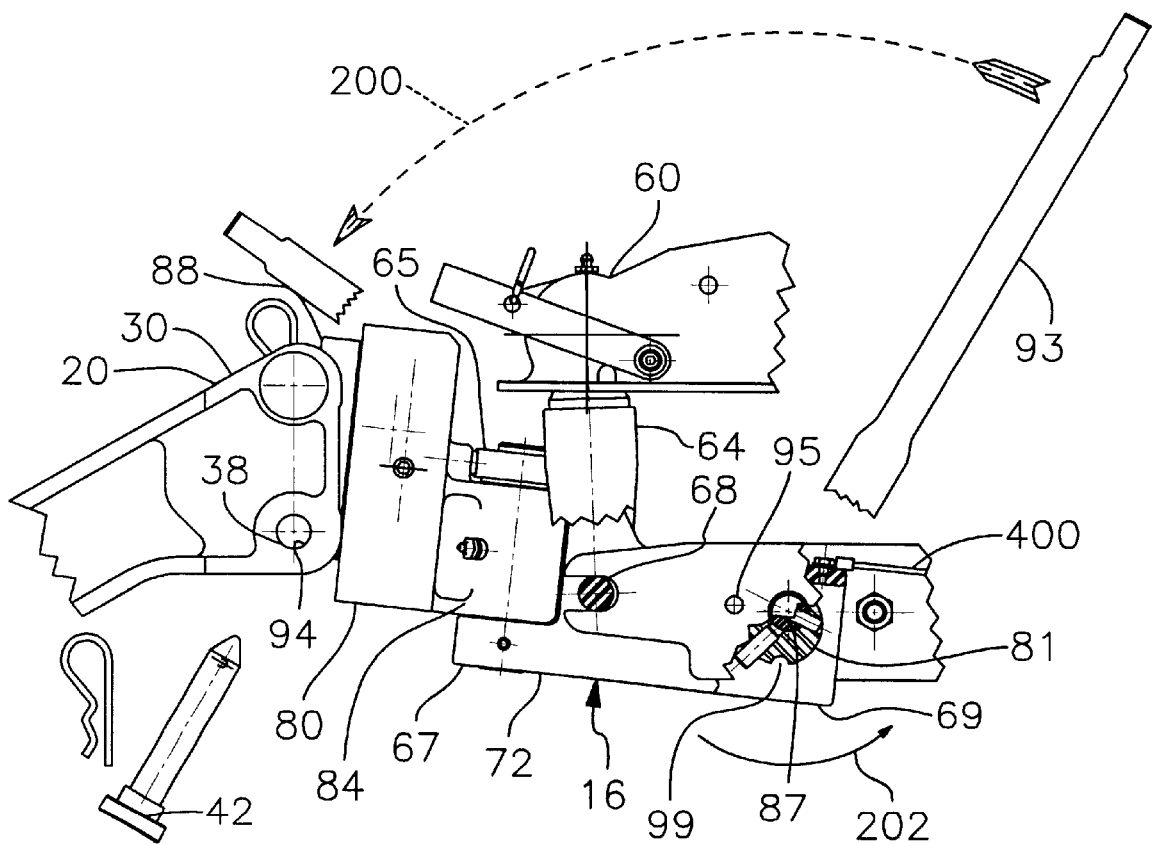
FIG. 4 is an elevational, side and partly cut away view illustrating how the adjuster cam is operated by a lug wrench to align the lower hitchpin holes of the drawbar and the horn.
Figure 5:
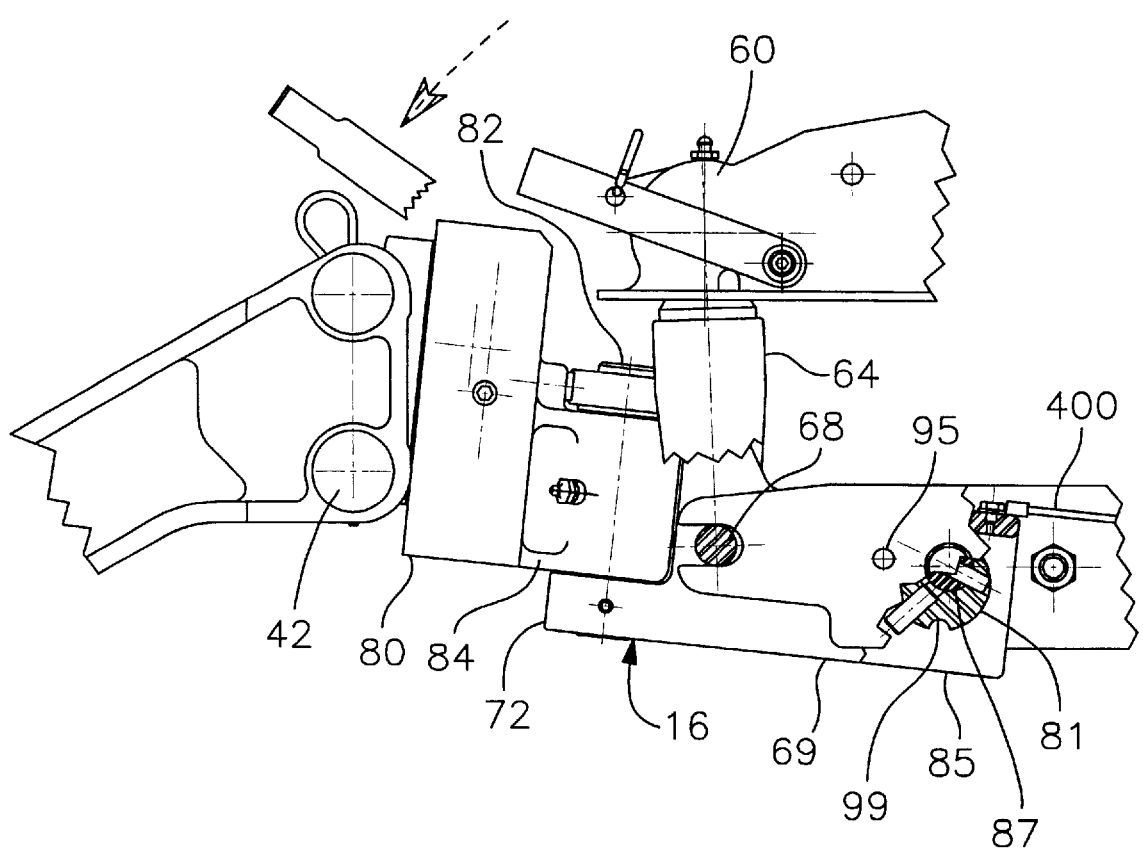
FIG. 5 is a view similar to FIG. 4 illustrating the lug wrench in its forward position and the lower hitchpin being inserted into the aligned holes of the drawbar and cam.
Figure 6:
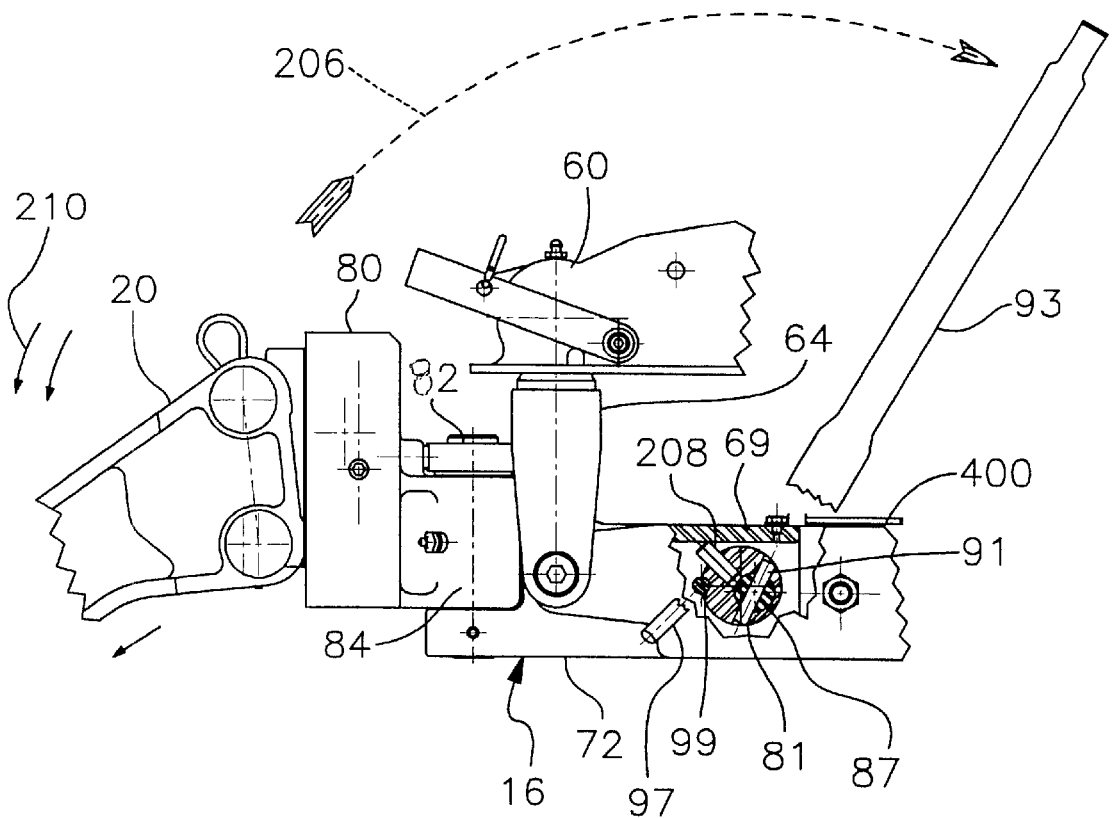
FIG. 6 is a view similar to FIGS. 4 and 5 illustrating rearward rotation of the lug wrench and the adjuster cam and relocking of the cam; this operation transfers the angle of the lower horn hitchpin hole to the drawbar.

The lower hitchpin holes are aligned in the manner best shown in FIG. 4. The user grasps lug wrench 93, shown alone in FIG. 12, and engages the lug wrench operably with hex nut 89 (FIG. 8A) of cam shaft 87 (FIGS. 4 through 6 and 8A). Cam locking pin 97, FIG. 6, is removed (if not already removed) from holes 95 and from previously aligned circumferential slot 99 in cam 81. The user then rotates wrench 93 forwardly as indicated by arrow 200 in FIG. 4. This causes cam 81 to rotate as indicated by arrow 202. The cam urges shank 69 to pivot upwardly such that the lower hitchpin holes in the first coupling component 30 and the horn 88 are aligned. See lower hitchpin hole 94 in FIG. 4. The entire hitchhead is pivoted upwardly until the distal end of drawbar 20 engages the U-channel 80. At this point, the lower hitchpin holes are aligned and the lower hitchpin 42 is inserted into those aligned holes. See FIG. 5. The inserted lower hitchpin is secured in place with a standard hitchpin clip. It should be noted that if the lower hitchpin holes are not perfectly aligned after the cam is operated, a jack may be used to complete such alignment.

Adjustment is completed by again engaging the lug wrench 93 with hex nut 89 and rotating the cam shaft in the opposite direction shown by arrow 206 in FIG. 6. As best shown therein, cam 81 carries a set screw 208 that engages the upper surface of shank 69 and thereby limits further rotation of the cam shaft and cam. At this limit point, the circumferential cam slot 99 is aligned with the cam lock holes 95 in drawbar extension 66. Cam lock pin 97 is inserted into the aligned holes so that the cam is locked in place and further movement is prevented. Rearward rotation of cam 81 in this manner returns the hitchhead assembly 16 to its initial condition and imparts a 6° axial angle to drawbar 20 as indicated by arrows 210 in FIG. 6. This transmits the required torsion to the frame of the tow vehicle. When the cam is locked in place, the jack is lowered and removed and installation is completed. Hitch apparatus 10 is th ereby fully assemble d and ready for operation in the manner shown in FIG. 13.

As the tow vehicle is driven, drawbar extension 66 is pivotably connected to and pulls trailer 12 at a point located significantly behind and below the trailer ball. The towing force is applied to the trailer at the end of the drawbar extension and not at the hitch ball. trailer and the hitch, as well as the spring force of assembly 300 accomplishes this. During normal operation on a level surface, virtually no hinging is permited about pivot 302. If a bump or dip is struck, the spring assembly allows the drawbar extension to pivot (about pivots 68 and 302) and thus permits the requisite hinging between the tow vehicle and the trailer. Preloaded spring assembly 300 then quickly returns the drawbar extension to its original position (i.e. the spring assembly restricts pivoting of the drawbar extension about pivots 68 and 302) after the bump or dip is traversed and thereby serves to dampen hinging movement between the tow vehicle and the trailer. An improved, stable ride is achieved. At the same time, the resulting tongue weight normally needed to offset an upward hinge or toggle effect is reduced substantially.

The new hitch eliminates the free hinging in every direction and upward toggling by extending the drawbar back under the trailer frame and providing the application of the towing force at a coupling joint which is below the line joining the axles of the tow vehicles and the trailer. This means that any toggle force generated by the trailer is downward and increases traction on the tow vehicle.

Reducing the tongue weight yields several important advantages. Less stress is exerted on the suspension and springs of the tow vehicle. Additionally, the transverse moment that is otherwise generated when the rig swerves, such as during lane changes or when taking evasive action, is significantly reduced. The risk of jackknifing and flipping is therefore minimized. Moreover, reducing the tongue weight reduces the need for additional items, such as propane tanks and tools, to be stored proximate the tongue. The precise reduction in tongue weight that is possible through the use of the invention may vary. However, the spring assembly is typically pre-loaded to reduce hinging sufficiently so that the tongue weight may be reduced to a level not exceeding 1.5 times the average weight per foot of the trailer. Ideally, the tongue weight that is required is between ½ and 1½ times the average weight per foot. This means that the tongue weight should ideally be approximately 120 to 300 pounds. One half of that weight is transmitted to the tow vehicle. Accordingly, through the use of this hitch, only 60 to 180 pounds of tongue weight acting on the tow vehicle. This is less than the average weight per foot of virtually all trailers. This is a negligible force, which should have virtually no effect on the tow vehicle or its suspension. Such a low force also permits the hitch of this invention to be utilized on vehicles that do not have a frame. The dolly required in the prior art is eliminated. By reducing the tongue weight required, the forward axial of the trailer may be moved forwardly along the trailer, which increases further the stability of the trailer.

Figure 14:
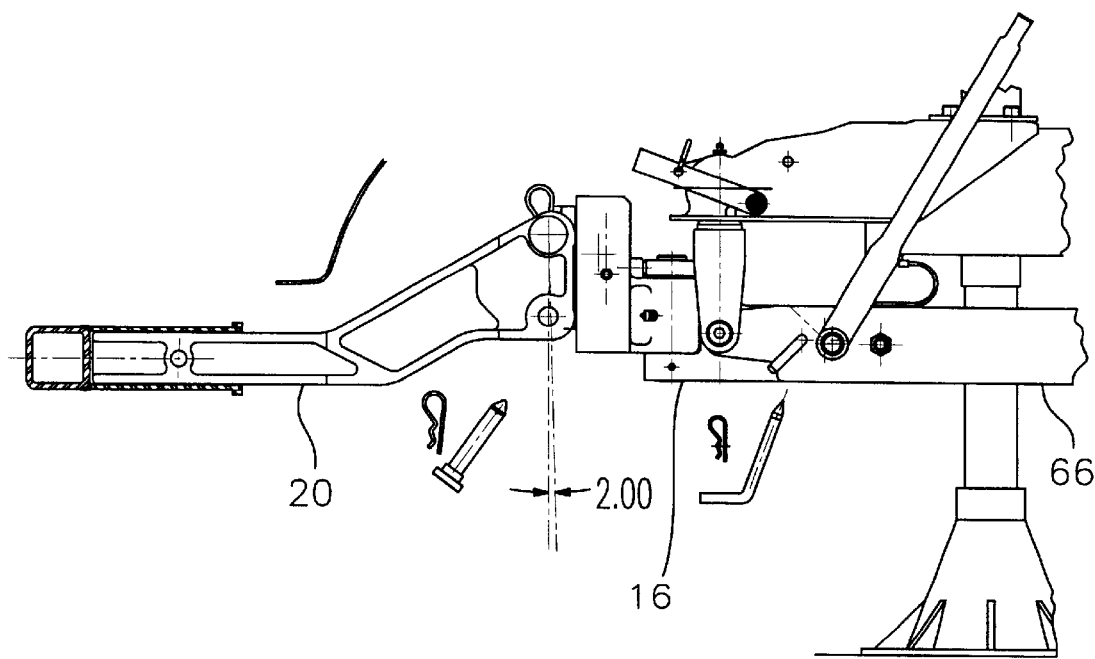
FIG. 14 is an elevational side view of an alternative hitch apparatus utilizing a 2° angle for the lower hitchpin hole of the horn; the lug wrench is pointed relatively rearwardly and the lower hitchpin holes of the horn and the second coupling component are not yet aligned.
Figure 15:
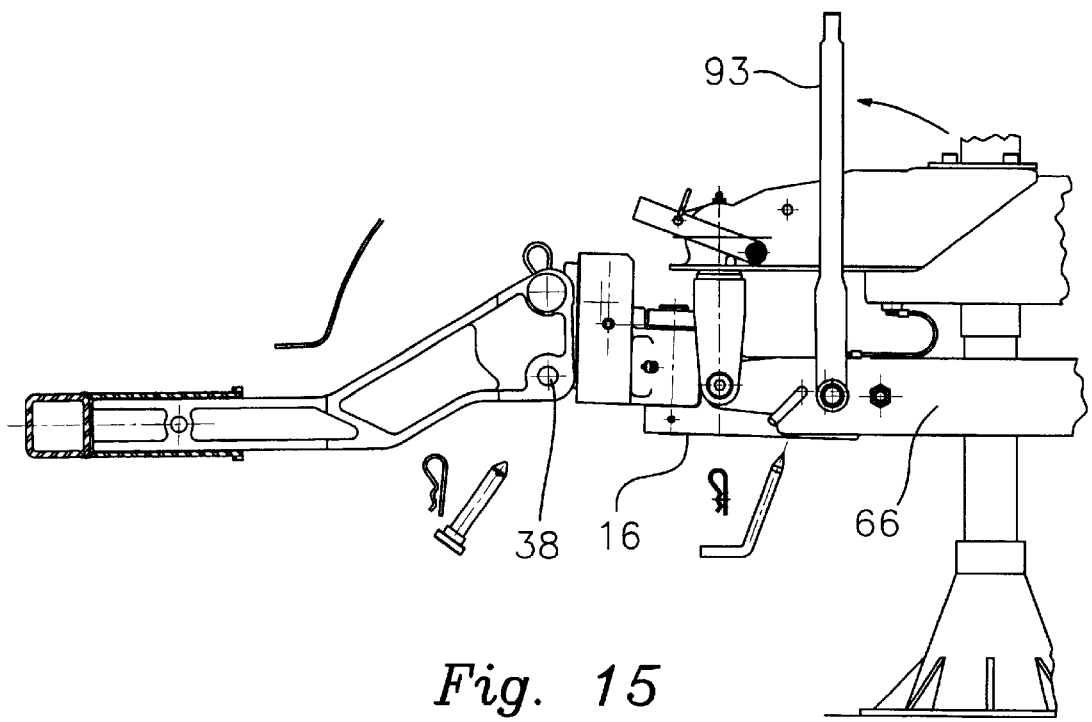
FIG. 15 is a view similar to FIG. 14 but with the cam rotated forwardly and the lower hitchpin holes aligned.
Figure 16:
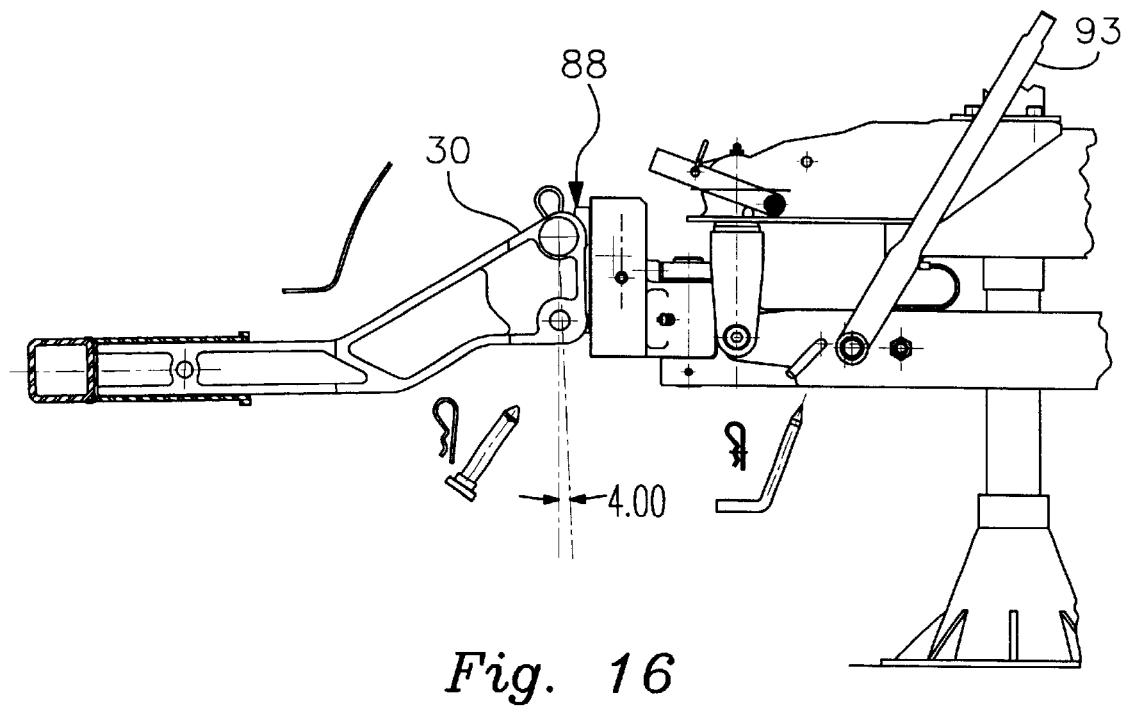
FIGS. 16 and 17 are side elevational views similar to views 14 and 15, respectively, but illustrating the use of a 4° angle on the horn.
Figure 17:
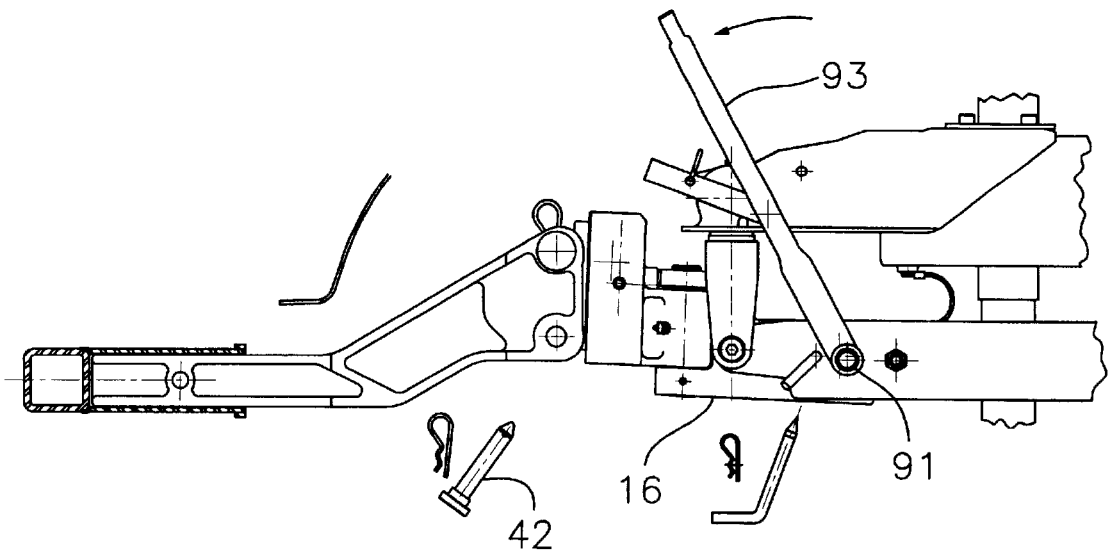

FIGS. 14 and 15 illustrate the cam adjustment that is made to the hitchhead assembly 16 when a horn having a 2° angle is employed. As previously stated, this type of horn angle is normally used when the tow vehicle has a heavy or strong frame. As best shown in FIG. 15, lug wrench 93 needs to be rotated only a small amount to align the lower hitchpin holes 38 (and 94 not shown). In FIGS. 16 and 17 a 4° horn angle is featured. Such an angle is normally selected for medium tow vehicle frames. As in the other embodiments, user interengages the second coupling component 30 and the horn 88. Lug wrench 90 is then operated to rotate the cam 81 as shown in FIG. 17 and hitchhead 16 is pivoted to align the lower hitchpin holes. Hitchpin 42 is then engaged with the aligned holes. The jack is lowered and coupling is complete. In each case, the selected angle is imparted to the drawbar so that the appropriate weight is distributed to the frame and wheels of the tow vehicle.

In each version of this invention, a connecting strap 400 is shown interconnecting the trailer frame 52 and shank 69. This connecting strap prevents the hitchhead from tipping too far downwardly when the tow vehicle is uncoupled from the trailer.

FIGS. 18 through 20B depict an alternative single coil spring assembly 300a that may be employed with this invention. In this case, the spring assembly employs a single spring 304a that is wound about a central tube 330a. The spring is disposed vertically in a tubular housing 306a comprising telescopically interconnected upper and lower cylindrical components 308a and 310a. The lower end of the spring assembly is analogous to that previously described for the three spring unit. In particular, a connector link 301a is joined to X-axis pivot 302a. A link assembly 316a and integral projection 322a are connected by pin 317a to a block 328a. The block extends slidably through a plate 329a which is, in turn, fixedly supported on a underlying plate 331a. (See also FIG. 18) The latter plate is at least partly supported by frame component 339. Block 328a is secured to the lower end of central tube 330a. Single spring 304a is wound about tube 330a. The upper end (FIG. 20B) of tube 330a is connected to a shaft 334a that is received slidably through end cap 340a. The upper end cap is received by and engaged with the upper cylindrical housing component 308a. Spring 304a urges cap 340 upwardly against an upper plate 337a that is secured at the upper ends of posts 341. A head 335a carried by shaft 334a sits in a clearance 333a of plate 337a and engages the upper surface of cap 340a. The posts are themselves attached at their lower ends to plate 329a. The lower end of the coil spring sits on a movable base 350a (FIG. 20A) that is interengaged with block 328a.

When couple 302a and connector link 301a are urged upwardly, the block engages the movable base 340a, which compresses spring 304a and components 308a of 310a of housing 306a to dampen movement. (Note that shaft 334a slides through cap 340a and clearance 333a of plate 337a.) Conversely, when couple 302a and link 301a are pulled downwardly, link assembly 316a and attached block 328a pull tube 330a and shaft 334a downwardly. This pulls cap 340a to compress cylindrical components 308a, 310a against spring 304a, which likewise dampens hinging and toggling.

Figure 21:
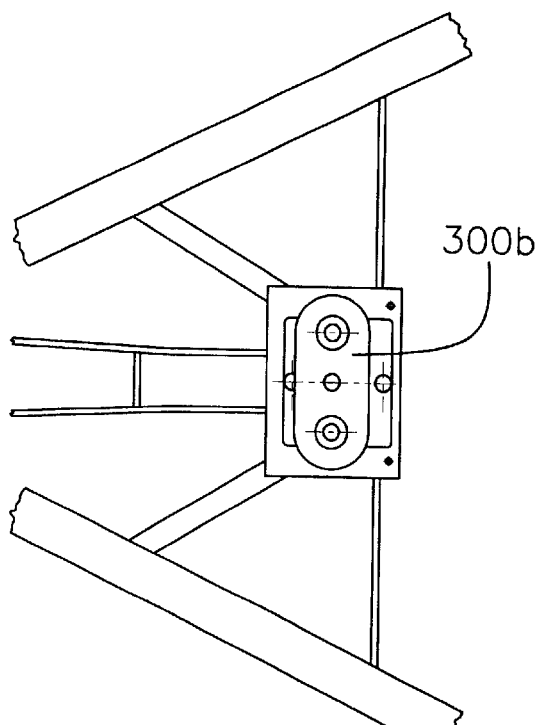
FIG. 21 is a top plan view of an alternative version of the hitch utilizing a double coil spring dampening device.
Figure 23:
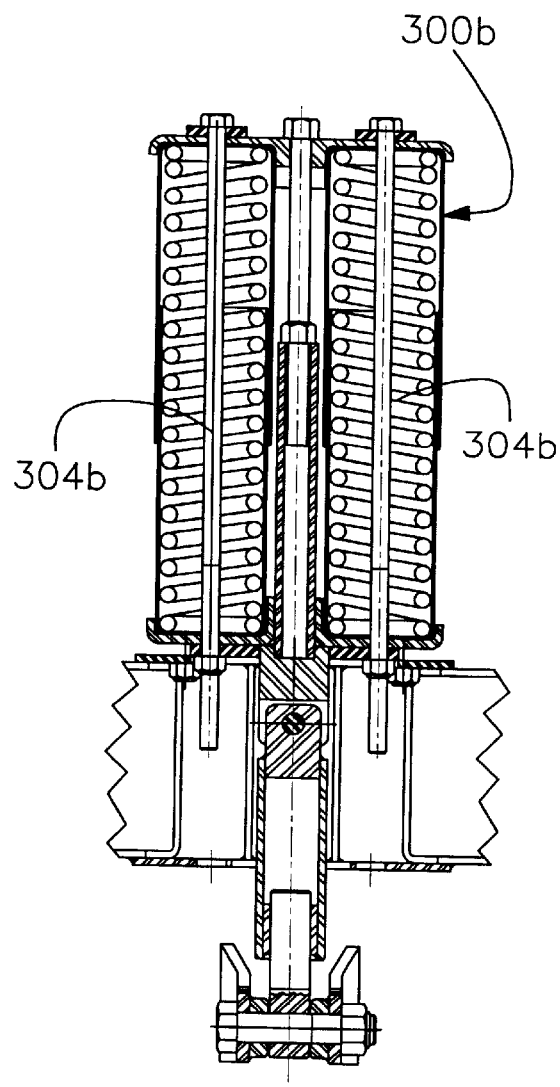
FIG. 23 is a cross sectional view taken along line 23—23 of FIG. 21.
Figure 22:
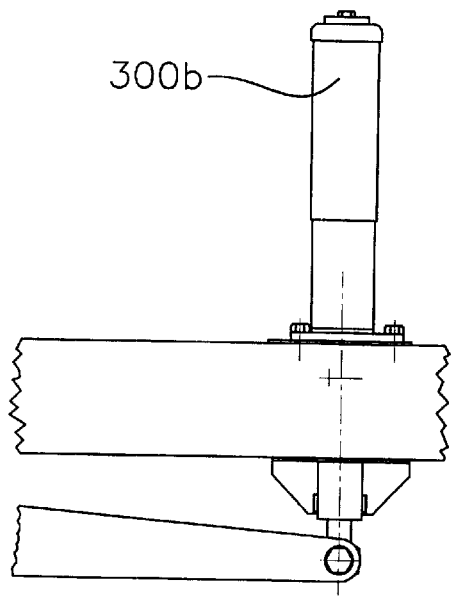
FIG. 22 is a side elevational view of the double spring dampening device.

FIGS. 21 through 23 depict another spring assembly 300b that utilizes a pair of coil springs 304b. This version operates analogously to the previously described spring assemblies. Indeed, this version is construction virtually identical to the version shown in FIGS. 1 through 13, with the exception that two coil springs are utilized.

In each of the coil spring dampening embodiments, the coil spring(s) is (are) preloaded to achieve the desired dampening effect.

The alternative spring embodiments shown herein may be employed according to the following chart:

| NUMBER OF SPRINGS | TRAILER TONGUE WEIGHTS |
|---|---|
| 1 | Maximum 500 pounds |
| 2 | 500 to 1,000 pounds |
| 3 | 1,000 to 1,500 pounds |

The parameters contained in this chart may be varied within the scope of this invention. Accordingly, although the trailer hitch of this invention permits the tongue weight to be significantly reduced and obtains the advantages that result from using a reduced tongue weight, the hitch may also be sold on the after market and used with trailers having existing heavy tongue weights. By employing a double spring embodiment, tongue weights of 500 to 1,000 pounds may be accommodated. The three spring embodiment can comfortably handle a tongue weight of up to 1,500 pounds. Various other numbers of springs and tongue weights may be featured within the scope of this invention. It should also be understood that other types of spring dampening assemblies such as the disc spring dampening assembly described in the above referenced applications, may be employed in this apparatus.

The use of a cam as described above is particularly advantageous for adjusting the apparatus to properly distribute heavy tongue weights. As described above, when such heavy tongue weights are encountered, the horn angle must be adjusted to a greater extent than for light tongue weights. Without the use of a cam, the installer would have to raise the jack to an undesirable and precariously high level in order to obtain the needed horn angle. This angle is simply and conveniently achieved through the use of the above described cam without having to operate the trailer jack nearly as much.

Figure 24:
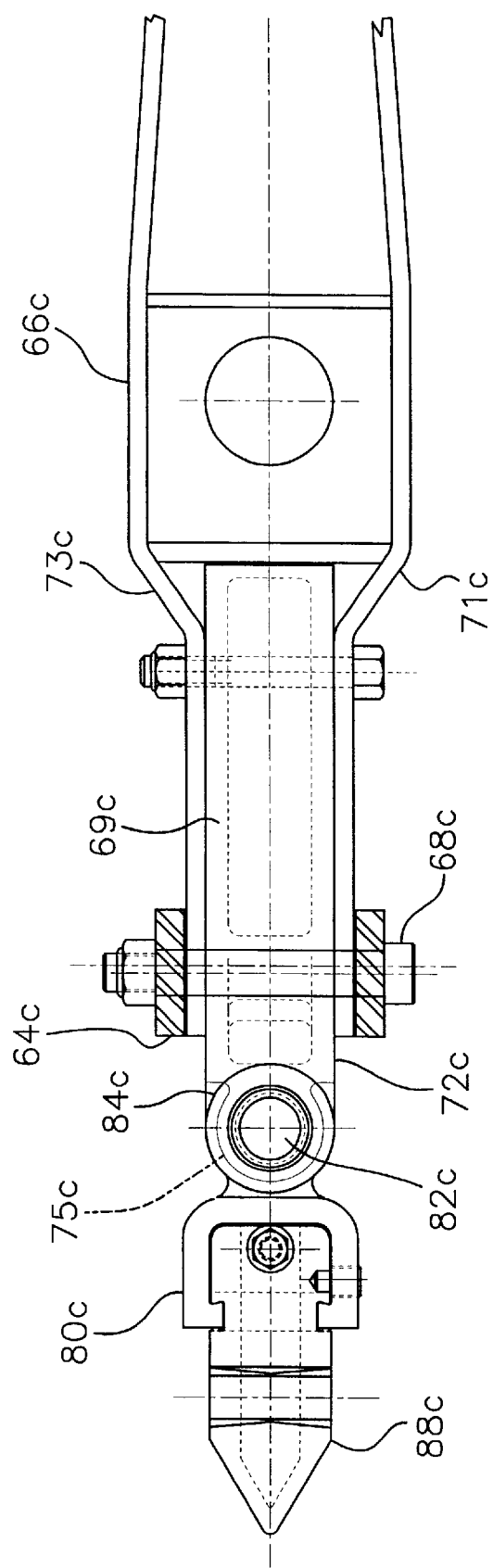
FIG. 24 is a partly cross sectional top view of an alternative hitchhead assembly according to this invention, which employs a drawbar extension without a cam for use in accommodating lighter tongue weights.
Figure 25:
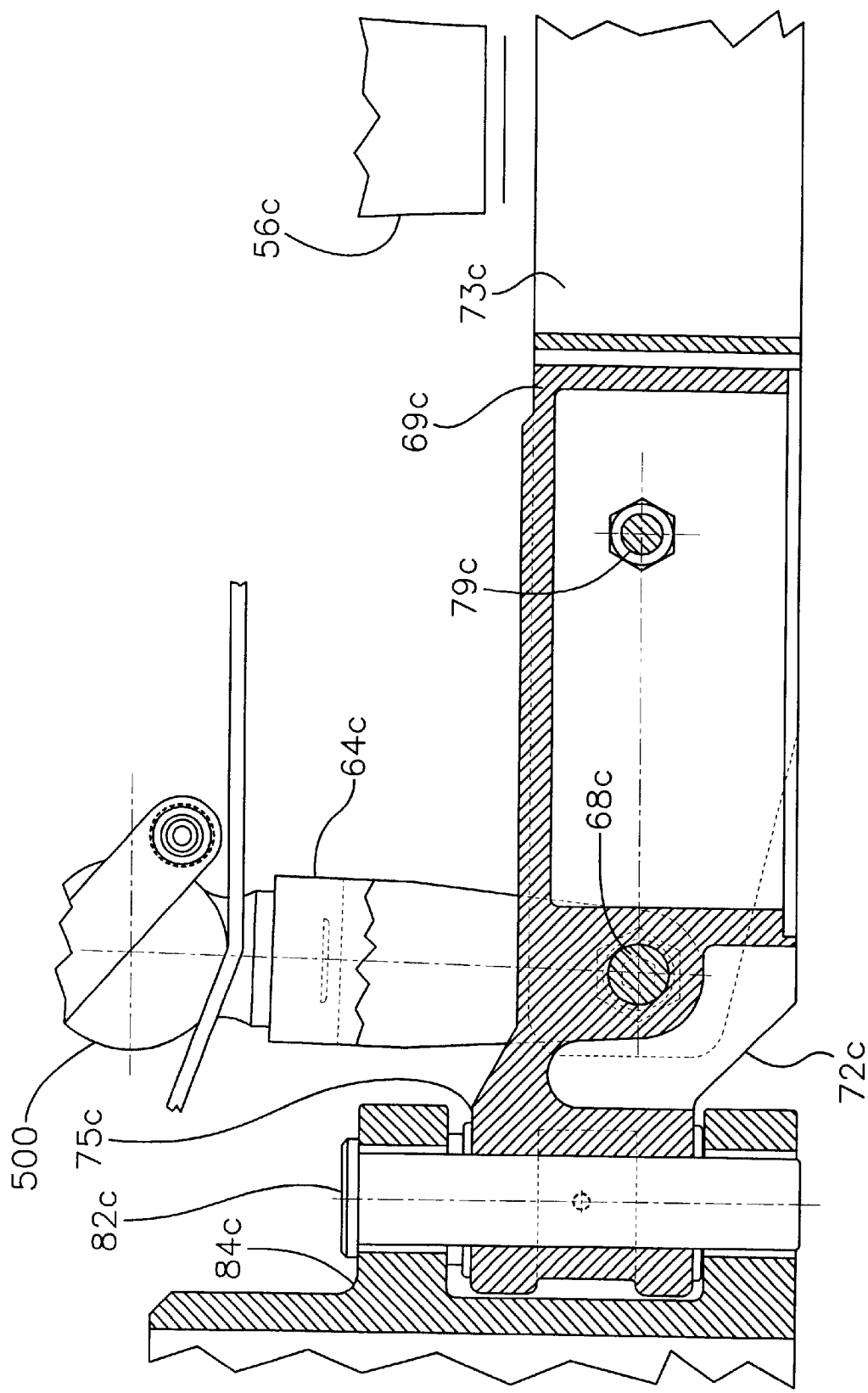
FIG. 25 is an elevational side cross sectional view of the drawbar extension of FIG. 24.

An alternative version of this invention, which utilizes a simpler drawbar extension is depicted in FIGS. 24 and 25. This embodiment is utilized in situations where fairly light tongue weights are involved (e.g. in newly manufactured trailers rather than in retro-fit applications).

In the version of FIGS. 24 and 25, the hitchhead assembly again includes a standard ball element 500 (FIG. 25 only) that carries a clevis 64c. The ball element again comprises the Y-axis coupling about which the rig rotates when one of the wheels strikes a curb, for example. A yoke 72c is pivotally connected to the lower end of clevis 64c by a horizontal bolt or other type of pivot 68c. Yoke 72c includes a sleeve or bearing 75c that is rotatably engaged with a vertical pin 82c. Pin 82c interconnects yoke 72c to a rearwardly extending bearing 84c of channel 80c. A horn 88c (FIG. 24 only) is slidably received by channel 80c in the previously described manner. Pin 65c permits the channel to rotate relative to drawbar extension 66c about the vertical or Z-axis.

In this embodiment, the drawbar extension is not adjusted by a cam. Yoke 72c includes a rearwardly extending shank 69c that is sandwiched between elongate element 71c and 75c. A connector 79c attaches members 71c and 73c to shank 69c. As a result, drawbar extension 66c is interconnected by yoke 72c to channel 80c and horn 88c of the hitchhead assembly. The entire drawbar extension pivots relative to clevis 64c about pin 68c.

The drawbar extension of the second embodiment operates in a manner analogous to the that of the first extension, with the exception that no cam adjustment is provided. This version is intended primarily for trailers having a relatively light tongue weight. Not as great a horn angle adjustment is required. The necessary angular adjustment may be achieved by simply using jack 56c alone.

Figure 18:
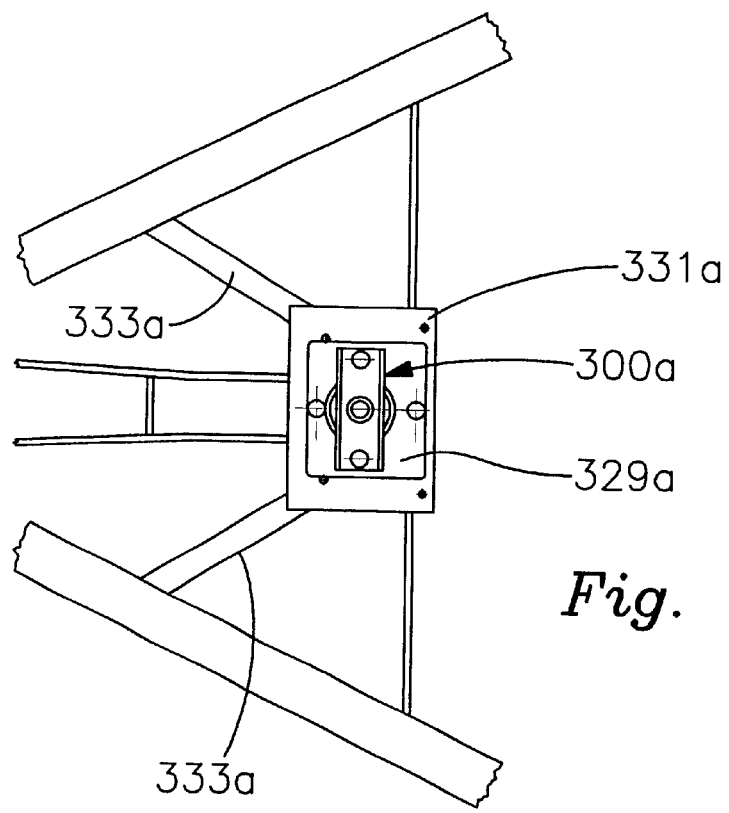
FIG. 18 is a top plan view of a version of the hitch utilizing a single coil spring dampening device.
Figure 19:
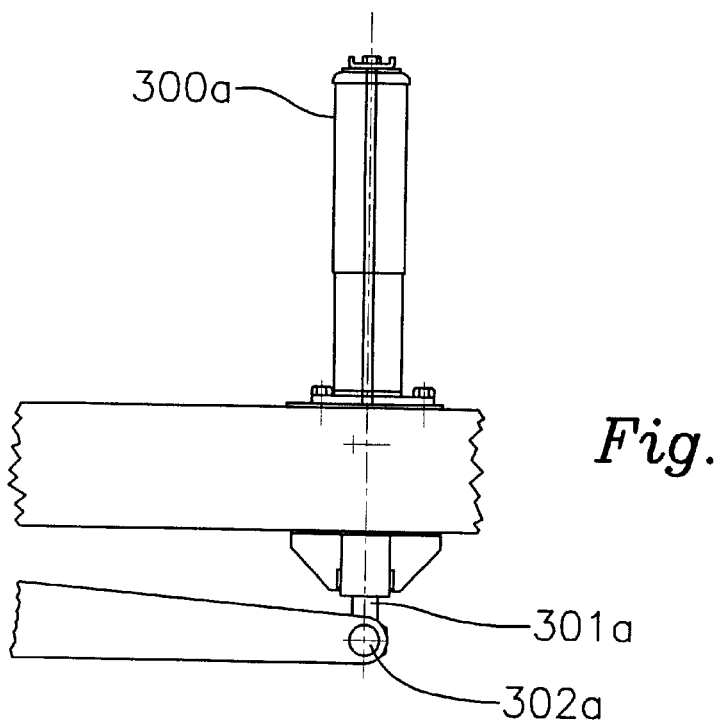
FIG. 19 is a side elevational view of the single coil spring dampening device.
Figure 20A:
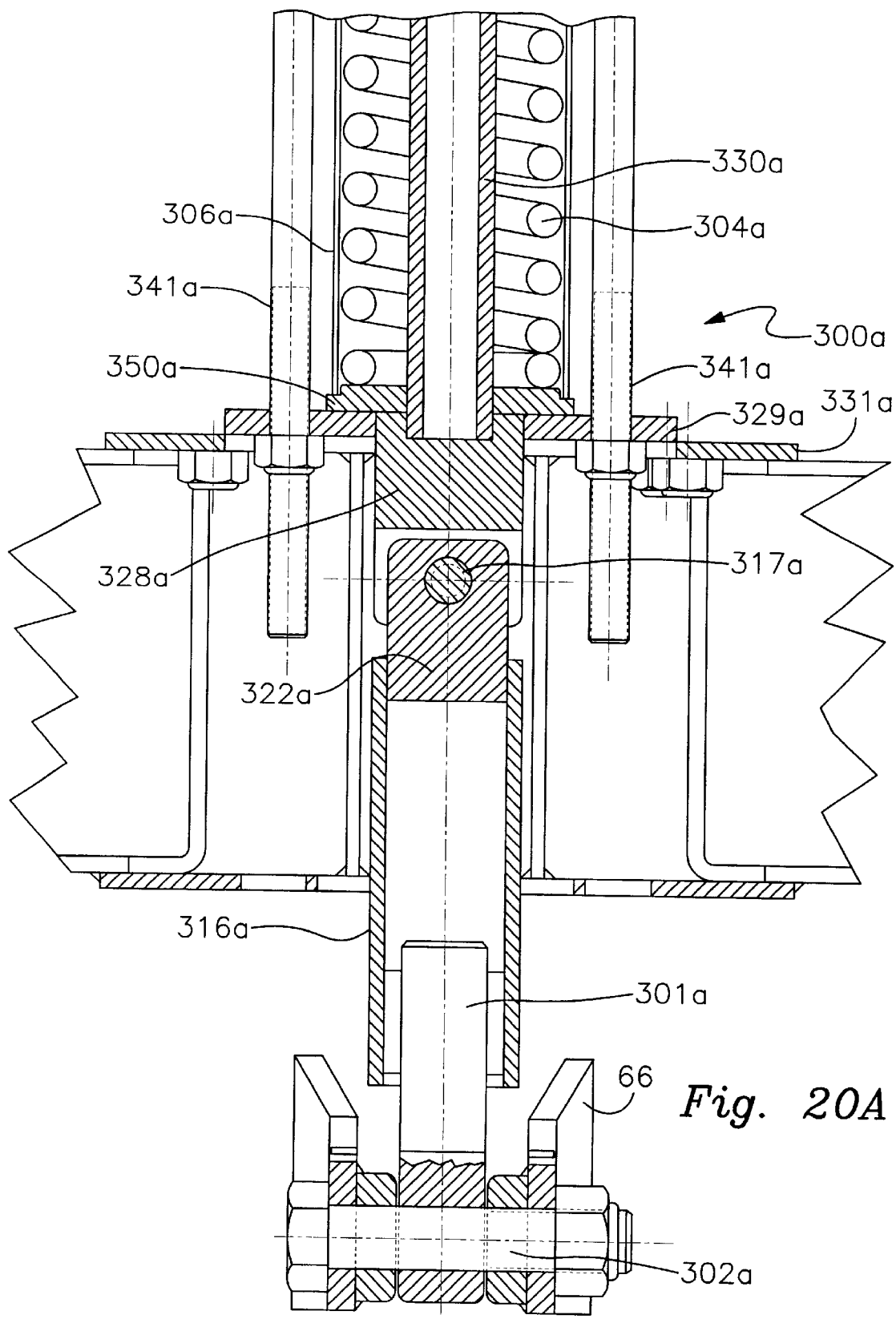
FIG. 20A is a cross sectional view of the lower end of the spring dampening assembly taken along line 20—20 of FIG. 18.
Figure 20B:
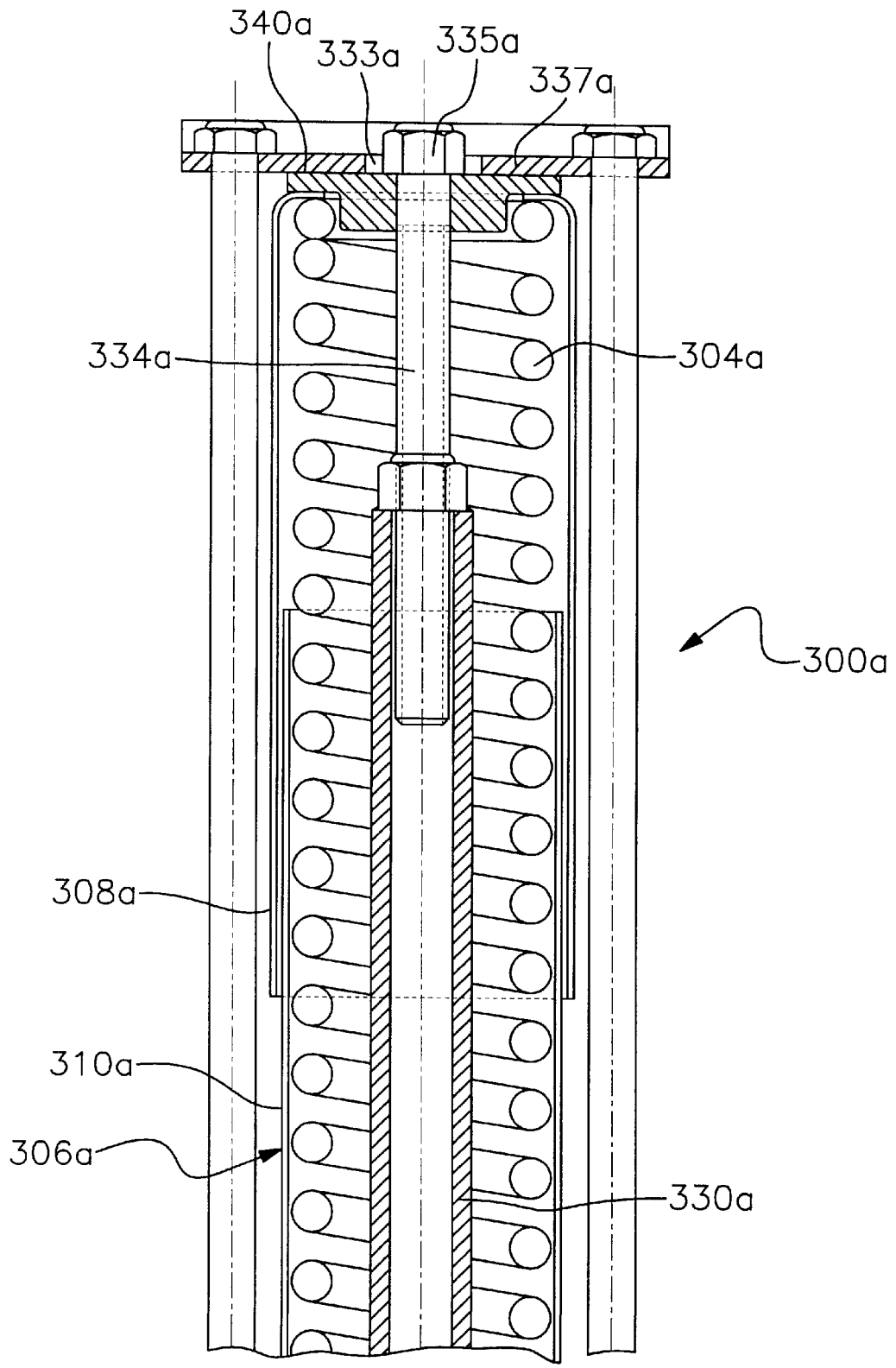
FIG. 20B is a cross sectional view of the upper end of the spring dampening assembly taken along line 20—20 of FIG. 18.

In all other regards, the second embodiment of this invention operates analogously to the first embodiment. In particular, the spring dampening means, as previously described, are formed at the rearward end of drawbar extension 66c. In as much as this version is typically employed for fairly light tongue weights, normally only a single coil spring is required, as shown in FIGS. 18 and 19. Nonetheless, multiple springs may also be employed with the drawbar extension of FIGS. 24 and 25. Additionally, other forms of spring dampening assemblies, including the disc springs disclosed in the above referenced patent applications may be utilized. In any event, the advantages previously described are likewise obtained by this version.

Coil Springs are particularly effective for use in the spring assembly. When compressed and held in a loaded condition, such springs effectively support the tongue weight. Then during travel, the double-acting coil springs may be further compressed by either an upward or downward force to dampen trailer bounce. For example, in applications on trailers with low tongue weight, the double-acting spring assembly may be preloaded or compressed to support a tongue weight of 500 lbs., or more if the trailer is over 25' in length. This compression effectively controls bounce.

Whereas the second embodiment is particularly preferred for use in new trailers, the initially described embodiment is especially effective for retro-fit situations. The ability to adjust the angle for virtually all tongue weights permits the assembly to be installed in existing trailers having a wide assortments of such weights.

Figure 26:
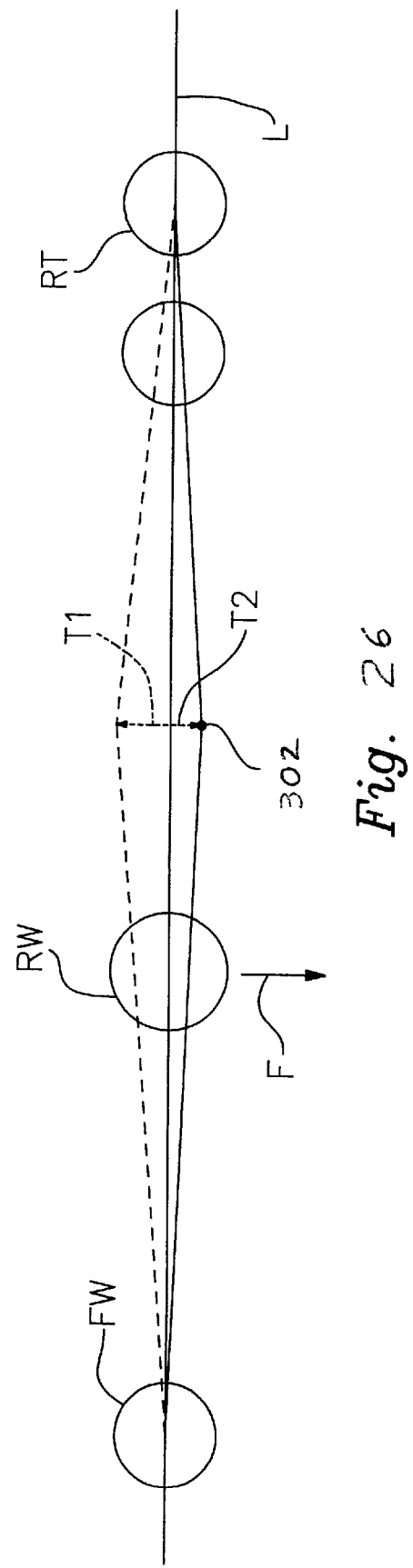
FIG. 26 is a schematic view that exhibits the downward toggle and positioning of the couple below the axis connecting the centerlines of the wheel axles in accordance with this invention.

Placement of the X-axis coupling along the axis of pivot 302 further contributes to the stability of the device. As illustrated in the schematic drawing of FIG. 26, the x-axis coupling is positioned approximately two inches below the longitudinal axis L connecting the centerline of the axle of the forwardmost tow vehicle wheel FW and the axle centerline of the rearwardmost trailer wheel RT. As a result, the hitch exhibits a more stable downward toggle T2, rather than the less stable upward toggle T1 exhibited by most known hitches. When the tow vehicle brakes, this downward toggle produces a downward force F that urges the rear wheels RW of the tow vehicle into secure, gripping interengagement with the road surface. Lifting of the rear tow vehicle wheels and resulting instability are thereby avoided, particularly when sudden stops are required. A significant reduction of tongue weight is also achieved. That weight is reduced from approximately 15% to at least as low as 7.5%, and possibly even less of the load weight. The excess weight remains on the axles of the trailer rather than overloading and overstressing the tow vehicle. This further enhances stability. Unlike prior hitches, the X-axis coupling represented by pivot 302 is spaced apart and distinct from the Z-axis coupling (pin 82) and the X and Z axes do not intersect. These axes are separated sufficiently such that the tow vehicle can rotate freely relative to the trailer about the Z-axis. This permits the rig to properly negotiate turns. Also, separating the X and Z axes restricts rotation about the Z-axis (pin 82) when a sudden bump or dip is encountered. This improves stability somewhat.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. In a trailer hitch apparatus that releasably connects a trailer to a tow vehicle, each of the tow vehicle and trailer having forwardmost and rearwardmost axles, and wherein the trailer and tow vehicle further include a longitudinal axis that extends generally between a centerline of the forwardmost tow vehicle axle and the rearwardmost trailer axle, the improvement comprising:

a forward hitch portion that is releasably attachable to the tow vehicle; and a rearward hitch portion having a hitch ball releasably attachable to the trailer and carrying an X-axis coupling rearwardly of said hitch ball, said X-axis coupling being interconnectable to the trailer and locatable below the longitudinal axis, whereby a downward toggle is exerted on said X-axis coupling and, upon braking, said hitch apparatus applies a downward force to the rearwardmost axle of the tow vehicle.

2. The apparatus of claim 1 in which said coupling includes a coupling pin that is releasably engaged with said hitch apparatus.

3. The apparatus of claim 2 further including a dual acting spring assembly for interconnecting said coupling pin and said trailer.

4. In a trailer hitch apparatus that releasably connects a trailer to a tow vehicle, each of said trailer and said tow vehicle having forwardmost and rearwardmost axles, and wherein the trailer and tow vehicle further include a longitudinal axis that extends generally between a centerline of the forwardmost tow vehicle axle and a centerline of the rearwardmost trailer axle, the improvement comprising:

a forward hitch portion that is releasably attachable to the tow vehicle; and a rearward hitch portion having a hitch ball releasably attachable to the trailer and carrying an X-axis coupling rearwardly of said hitch ball, said X-axis coupling being interconnectable to the trailer by a dual acting spring assembly located above said X-axis coupling, said X-axis coupling further being locatable below the longitudinal axis, whereby a downward toggle is exerted on said X-axis coupling and, upon braking, said hitch apparatus applies a downward force to the rearwardmost axle of the tow vehicle.

5. The apparatus of claim 4 in which said X-axis coupling is pivotably connected to a lower end of said dual acting spring assembly.

* * * * *